(12) United States Patent
Tanaka et al.

(10) Patent No.: US 7,245,563 B2
(45) Date of Patent: Jul. 17, 2007

(54) OPTICAL PICKUP AND DISC DRIVE APPARATUS

(75) Inventors: Hidetoshi Tanaka, Chiba (JP); Yuji Shishido, Kanagawa (JP); Hiroshi Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 614 days.

(21) Appl. No.: 10/477,719

(22) PCT Filed: Apr. 8, 2003

(86) PCT No.: PCT/JP03/04463

§ 371 (c)(1),
(2), (4) Date: Nov. 14, 2003

(87) PCT Pub. No.: WO03/085652

PCT Pub. Date: Oct. 16, 2003

(65) Prior Publication Data

US 2004/0145976 A1  Jul. 29, 2004

(30) Foreign Application Priority Data

Apr. 8, 2002 (JP) ............................ P2002-104979
Jan. 23, 2003 (JP) ............................ P2003-014445

(51) Int. Cl.
*G11B 7/00* (2006.01)
*G11B 7/09* (2006.01)
(52) U.S. Cl. .................................. 369/44.16; 720/685
(58) Field of Classification Search ...................... None
See application file for complete search history.

(56) References Cited

U.S. PATENT DOCUMENTS 6,031,812 A * 2/2000 Liou ........................ 720/683

6,411,590 B1 * 6/2002 Yoshida et al. ............. 369/184
2001/0026404 A1 * 10/2001 Suh ............................ 359/822

FOREIGN PATENT DOCUMENTS

JP  11-3536763  12/1999

(Continued)

OTHER PUBLICATIONS

International Search Report dated Jul. 15, 2003.

*Primary Examiner*—William Korzuch
*Assistant Examiner*—Christopher Lamb
(74) *Attorney, Agent, or Firm*—Rader, Fishman & Grauer PLLC; Ronald P. Kananen

(57) ABSTRACT

An objective lens drive device (8) includes a supporting block (9), a movable block (10) for holding an objective lens (27), and supporting springs (22) for connecting the supporting block and the movable block. Elements of the supporting block of the objective lens drive device (8) are a stationary section (11), a supporting shaft (12), a tilt drive section (13), and tilt drive magnetic circuits (20 and 20). The stationary section (11) is secured to a movable base (7) that is movable in radial directions of a disc-shaped recording medium (100). An axial direction of the supporting shaft (12) is perpendicular to both focusing directions and tracking directions. The tilt drive section (13) is rotatably supported at the stationary section through the supporting shaft and is connected to the movable block through the supporting springs. The tilt drive magnetic circuits (20 and 20) are used to rotate the tilt drive section with respect to the stationary section.

32 Claims, 13 Drawing Sheets

FOREIGN PATENT DOCUMENTS

| | | |
|---|---|---|
| JP | 2000-011414 | 1/2000 |
| JP | 2000-67442 A | 3/2000 |
| JP | 2000-149292 | 5/2000 |
| JP | 2000-222754 | 8/2000 |
| JP | 2000-222754 A | 8/2000 |
| JP | 2001-110075 | 4/2001 |
| JP | 2001-344788 | 12/2001 |

* cited by examiner

OPTICAL PICKUP AND DISC DRIVE APPARATUS

TECHNICAL FIELD

The present invention relates to an optical pickup and a disc drive apparatus. More particularly, the present invention relates to the technical field of an optical pickup comprising an objective lens drive device having a movable block supported through a supporting spring and to a disc drive apparatus including the optical pickup.

BACKGROUND ART

A disc drive apparatus records an information signal onto and reproduces it from a disc-shaped recording medium such as an optical disc. Such a disc drive apparatus comprises an optical pickup for irradiating a disc-shaped recording medium with a laser beam by movement of the optical pickup in radial directions of the disc-shaped recording medium.

An objective lens drive device is disposed in the optical pickup. The objective lens drive device moves an objective lens, which is held by a movable block, to perform focusing adjustment in focusing directions, and moves the objective lens in tracking directions to perform tracking adjustment, so that a spot of a laser beam with which the disc-shaped recording medium is irradiated is focused on a recording track of the disc-shaped recording medium through the objective lens. The focusing directions correspond to directions in which the objective lens moves into contact with and separates from a recording surface of the disc-shaped recording medium. The tracking directions correspond to substantially radial directions of the disc-shaped recording medium.

In such an optical pickup, focusing adjustment and tracking adjustment are generally performed with an objective lens drive device. In recent years, in order to increase the followability of a laser beam spot with respect to a recording track, an objective lens drive device that is called a triaxial actuator has been developed. This type of objective lens drive device performs, in addition to bi-axial focusing and tracking adjustments, an adjustment, for example, when a surface of a rotating disc-shaped recording medium is deflected, with a movable block being tiltable with respect to a recording surface of the disc-shaped recording medium.

The following types of objective lens drive device that are called triaxial actuators have been developed.

In a moving-coil objective lens drive device, a movable block, which holds an objective lens, is connected to a stationary block through a supporting spring, and a tilt coil for tilting the movable block with respect to the stationary block is disposed at the movable block. (For example, Japanese Unexamined Patent Application Publication No. 2000-149292 (Patent Document) should be referred to.)

In the moving-coil objective lens drive device having a tilt coil disposed at the movable block, a focusing coil for performing focusing adjustment and a tracking coil for performing tracking adjustment are disposed separately from the tilt coil at the movable block. Therefore, two supporting springs are required for each coil for supplying drive current to the coils. Consequently, the movable block is supported at the stationary block with a total of six supporting springs.

In the moving-coil objective lens drive device, magnets oppose the focusing coil, the tracking coil, and the tilt coil, which are disposed at the movable block. Accordingly, drive current is supplied to the focusing coil, the tracking coil, and the tilt coil through the supporting springs. At this time, a thrust is generated in a predetermined direction by the coils and the magnets. Therefore, the movable block is moved with respect to the stationary block in a required direction to carry out adjustments.

In a moving-magnet objective lens drive device, which is a type of tri-axial actuator that is different from the moving-coil type, a movable block, which holds an objective lens, is connected to a stationary block through a supporting spring, and a tilt magnet for tilting the movable block with respect to the stationary block is disposed at the movable block.

In the moving-magnet objective lens drive device having a tilt magnet disposed at the movable block, a focusing coil, a tracking coil, and a tilt coil are disposed at the stationary block so that they oppose magnets at the movable block.

In the moving-magnet objective lens drive device, drive current is supplied to the focusing coil, the tracking coil, or the tilt coil, all of which are disposed at the stationary block, through a single-purpose electric supply line. At this time, a thrust is generated in a predetermined direction by the coils and the magnets. Therefore, the movable block is moved with respect to the stationary block in a required direction to carry out adjustments.

However, the above-described related objective lens drive devices that are adjustable in three axial directions have the following problems.

In the moving-coil objective lens drive device, two supporting springs for supplying electrical current to the tilt coil are required in addition to the four supporting springs required for focusing adjustment and tracking adjustment. Therefore, the stationary block and the movable block that have been connected together with four supporting springs considerably lose balance. Consequently, it is necessary to design the objective lens drive device so that the state of connection of the stationary and movable blocks is equivalent to that using four supporting springs. In addition, since it is not easy to design the objective lens drive device in such a way, production costs of such objective lens drive devices are increased.

Further, since the movable block is additionally provided with a tilt coil, the movable block is heavier and, thus, has reduced sensitivity.

Still further, since three types of coils are disposed at the movable block, for example, the specification of magnets opposing these coils is changed, thereby making it difficult to reduce the size and thickness of the objective lens drive device.

In order to increase the sensitivity of the movable block and drive it in a tilting manner, the rigidity of the supporting springs needs to be low. Therefore, the drive resonance frequency is decreased, and, depending upon the type of disc-shaped recording medium, an error in recording an information signal may occur.

On the other hand, in the moving-magnet objective lens drive device, since magnets having a relatively high specific gravity are disposed at the movable block, the moving block is particularly heavy, thereby considerably reducing its sensitivity. In order to overcome the problem of a reduction in sensitivity, it is necessary to use magnets that produce large magnetic force and to supply a large drive current, thereby resulting in problems such as an increase in production costs and power consumption of moving-magnet objective lens drive devices.

In addition, since three types of coils are disposed at the stationary block, the moving-magnet objective lens drive device is less easily assembled and is increased in size.

Accordingly, it is an object of the present invention to provide an optical pickup and a disc drive apparatus which make it possible to overcome the aforementioned problems, so that, with an objective lens drive device having good characteristics, the followability of a laser beam spot with respect to a recording track is improved.

DISCLOSURE OF INVENTION

In order to overcome the aforementioned problems, the present invention provides an objective lens drive device and a disc drive apparatus. The objective lens drive device comprises a supporting block, a movable block, and a supporting spring, the movable block holding an objective lens and moving with respect to the supporting block in focusing directions and tracking directions, the focusing directions corresponding to directions in which the movable block moves into contact with and separates from a recording surface of a disc-shaped recording medium, the tracking directions corresponding to substantially radial directions of the disc-shaped recording medium, and the supporting spring connecting the supporting block and the movable block. The supporting block comprises a stationary section, a supporting shaft, a tilt drive section, and a tilt magnetic circuit, the stationary section being secured to the movable base that is movable in radial directions of the disc-shaped recording medium, an axial direction of the supporting shaft being perpendicular to the focusing directions and the tracking directions, the tilt drive section being rotatably supported at the stationary section through the supporting shaft and being connected to the movable block by the supporting spring, and the tilt magnetic circuit rotating the tilt drive section with respect to the stationary section.

Therefore, in the objective lens drive device and the disc drive apparatus of the present invention, by the tilt magnetic circuit, which is disposed at the supporting block that supports the movable block, the tilt drive section and the movable block rotate integrally.

BEST MODE FOR CARRYING OUT THE INVENTION

Figure 1:
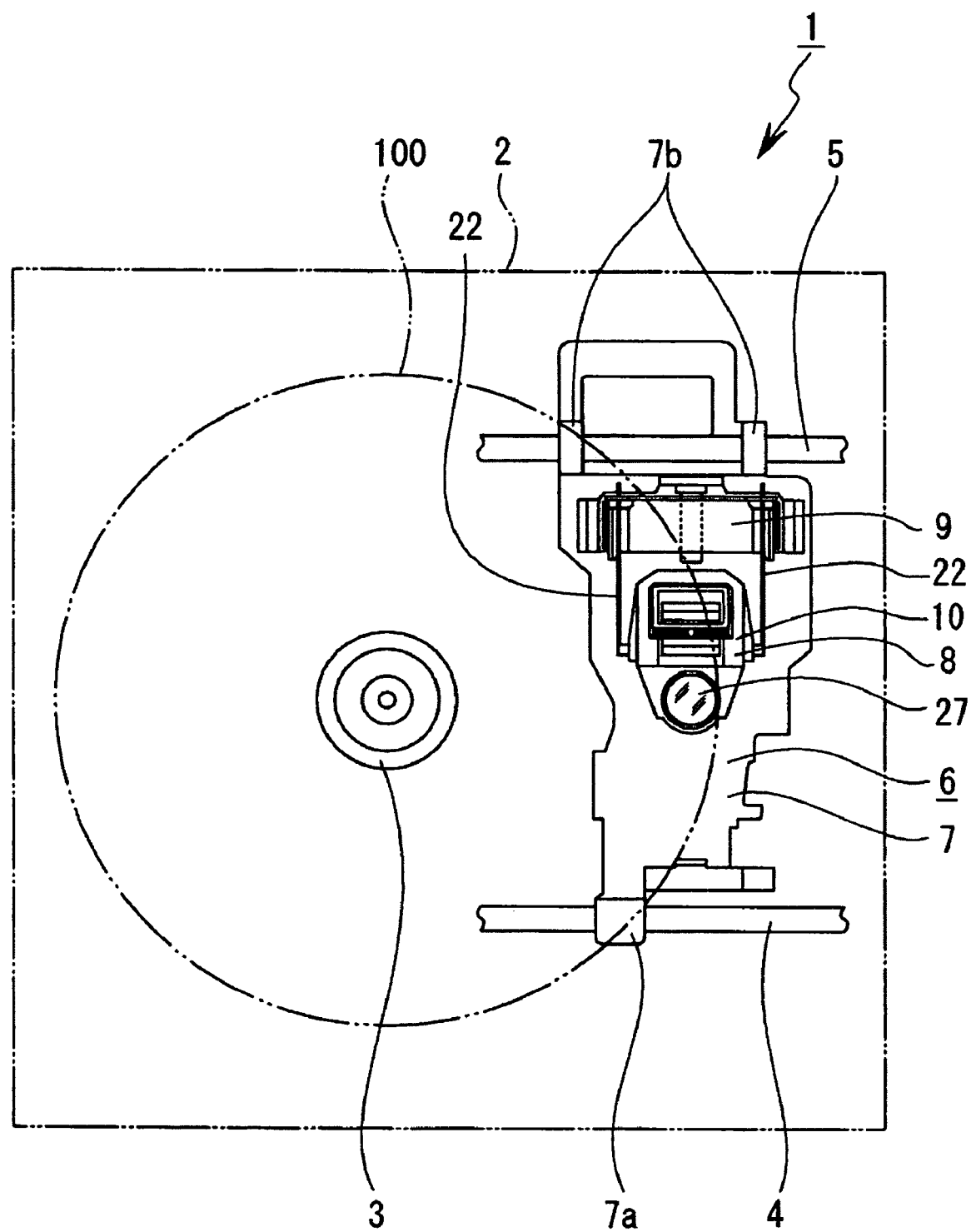
FIG. 1 illustrates a first embodiment of the present invention along with FIGS. 2 to 6, and is a schematic plan view of a disc drive apparatus.

Hereunder, a description of embodiments of an optical pickup and a disc drive apparatus of the present invention will be given with reference to the attached drawings.

First, a first embodiment of the present invention will be described with reference to FIGS. 1 to 6.

A disc drive apparatus 1 comprises required parts and mechanisms, which are disposed in a housing 2 (see FIG. 1), with a disc-insertion opening (not shown) being formed in the housing 2.

A chassis (not shown) is disposed in the housing 2. A disc table 3 is mounted to a shaft of a spindle motor mounted to the chassis.

Parallel guide shafts 4 and 5 are mounted to the chassis. A lead screw, which is rotated by a feed motor (not shown), is supported at the chassis.

An optical pickup 6 comprises a movable base 7, a required optical part, and an objective lens drive device 8. The optical part and the objective lens drive device 8 are disposed on the movable base 7. Bearings 7a and 7b, which are disposed on respective ends of the movable base 7, slidably support respective guide shafts 4 and 5 (see FIG. 1). A nut (not shown), which is disposed at the movable base 7, is screwed onto the lead screw. When the lead screw is rotated by the feed motor, the nut is moved in a direction corresponding to the direction of rotation of the lead screw, so that the optical pickup 6 is moved in a radial direction of a disc-shaped recording medium 100 mounted to the disc table 3.

Figure 2:
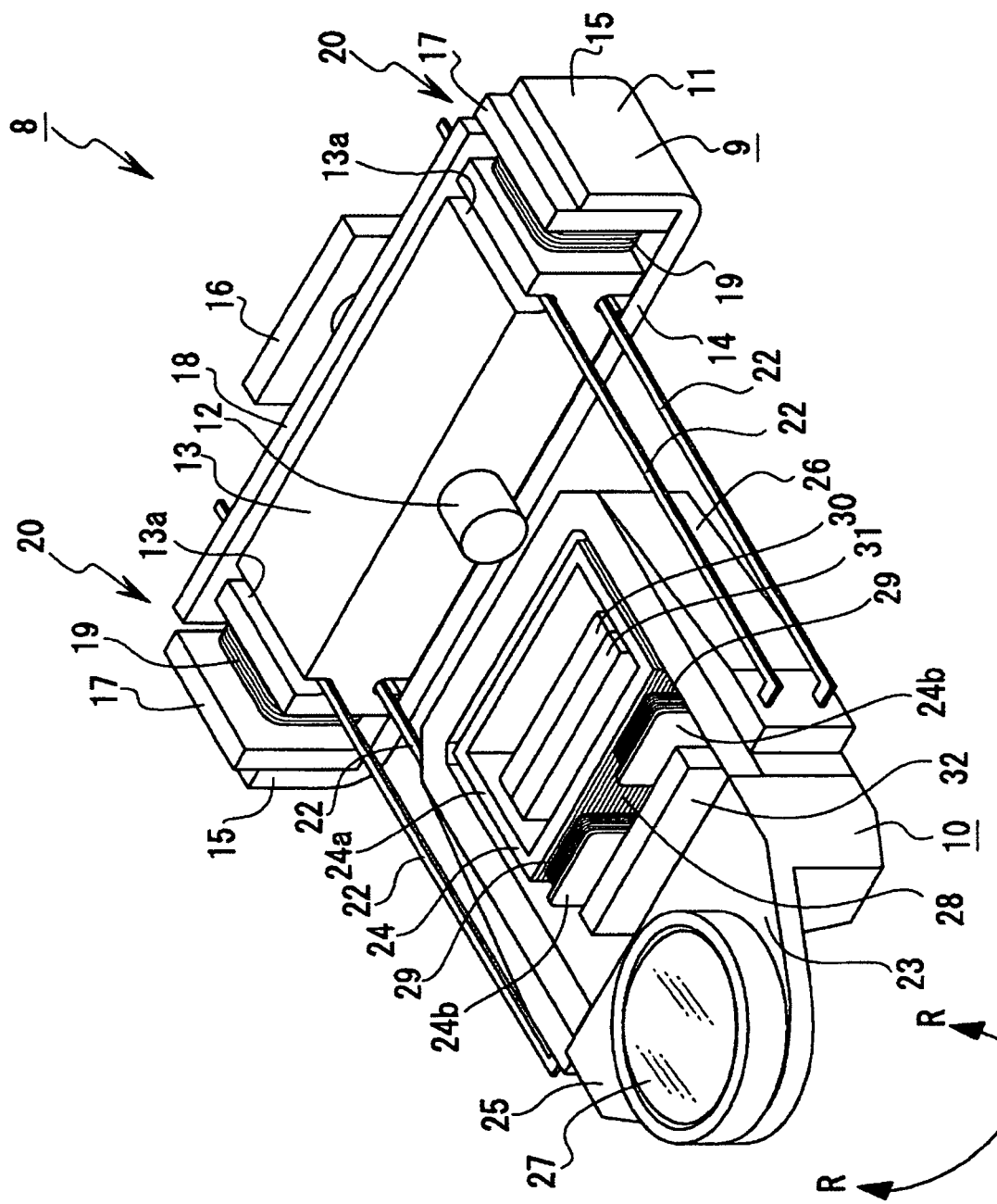
FIG. 2 is an enlarged perspective view of an objective lens drive device.
Figure 3:
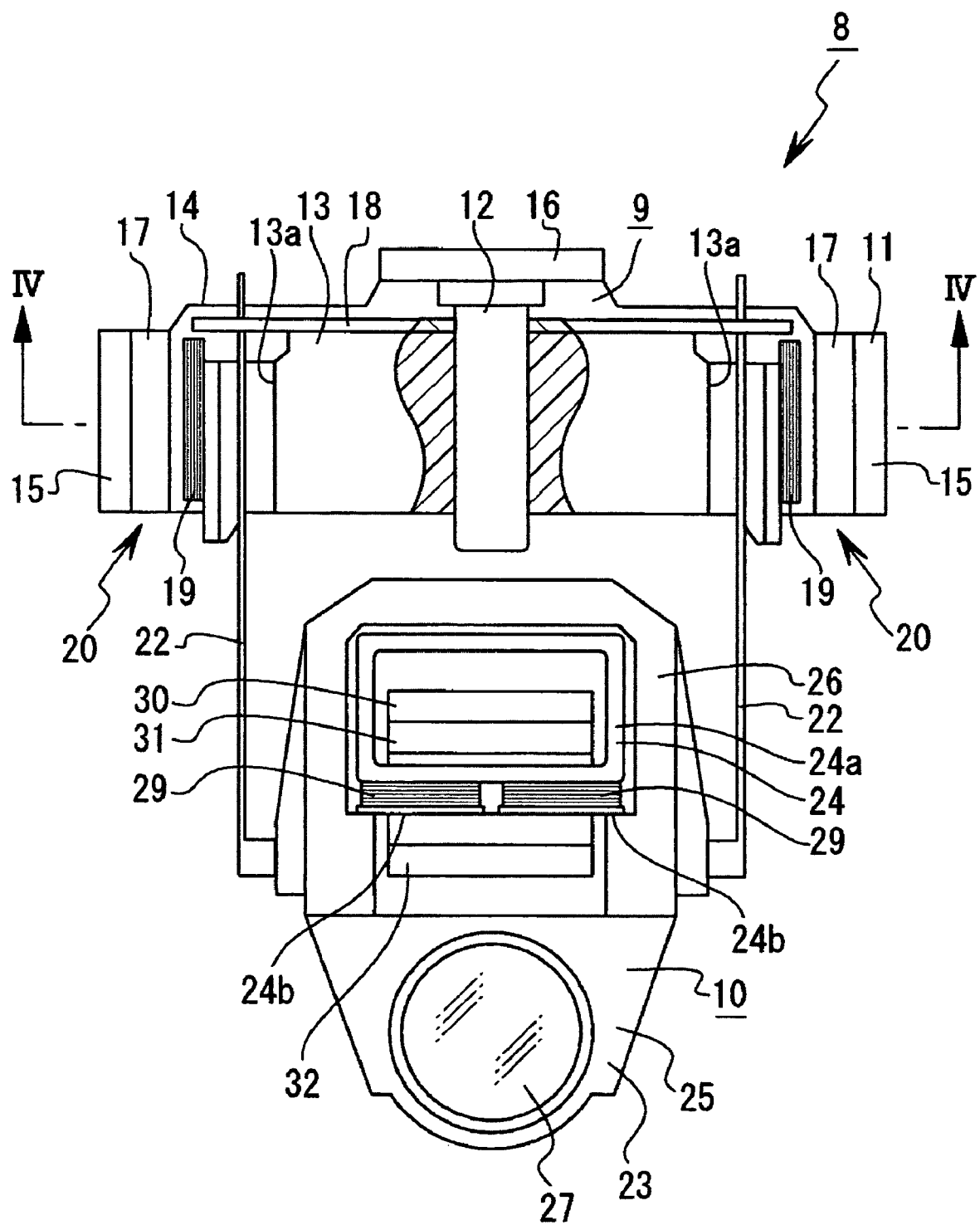
FIG. 3 is an enlarged plan view showing a portion of the objective lens drive device in cross section.

An objective lens drive device 8 comprises a supporting block 9 and a movable block 10, which moves with respect to the supporting block 9 (see FIGS. 2 and 3).

The supporting block 9 comprises a stationary section 11, which is secured to the movable base 7, and a tilt drive section 13, which is rotatably supported at the stationary section 11 through a supporting shaft 12.

Each portion of the stationary section 11 is integrally formed using a magnetic metallic material. The stationary section 11 comprises a base 14, mounting portions 15 and 15, and a shaft-forming portion 16. The base 14 has a substantially rectangular shape that is long in one direction. The mounting portions 15 and 15 are formed at right angles at respective ends of the base 14 in the longitudinal direction. The shaft-forming portion 16 is formed at right angles at one edge at the central portion of the base 14 in the longitudinal direction.

In the stationary section 11, the base 14 is secured to the movable base 7, and tilt magnets 17 and 17 are mounted to opposing surfaces of the mounting portions 15 and 15. The tilt magnets 17 and 17 have, for example, two magnetic poles (see FIG. 4).

The supporting shaft 12 traverses the base 14 from the shaft-forming portion 16 of the stationary section 11 and protrudes in such a manner as to be parallel with the mounting portions 15.

The tilt drive section 13 has a substantially rectangular parallelepiped shape that is long in the direction that the base 14 is long. A circuit board 18 is mounted to a surface of the tilt drive section 13 facing the shaft-forming portion 16 of the stationary section 11. Clearance slits 13a, which open upward, and clearance slits 13b, which open downward, are formed near two ends of the tilt drive section 13 in the longitudinal direction (see FIGS. 3 and 4).

Figure 4:
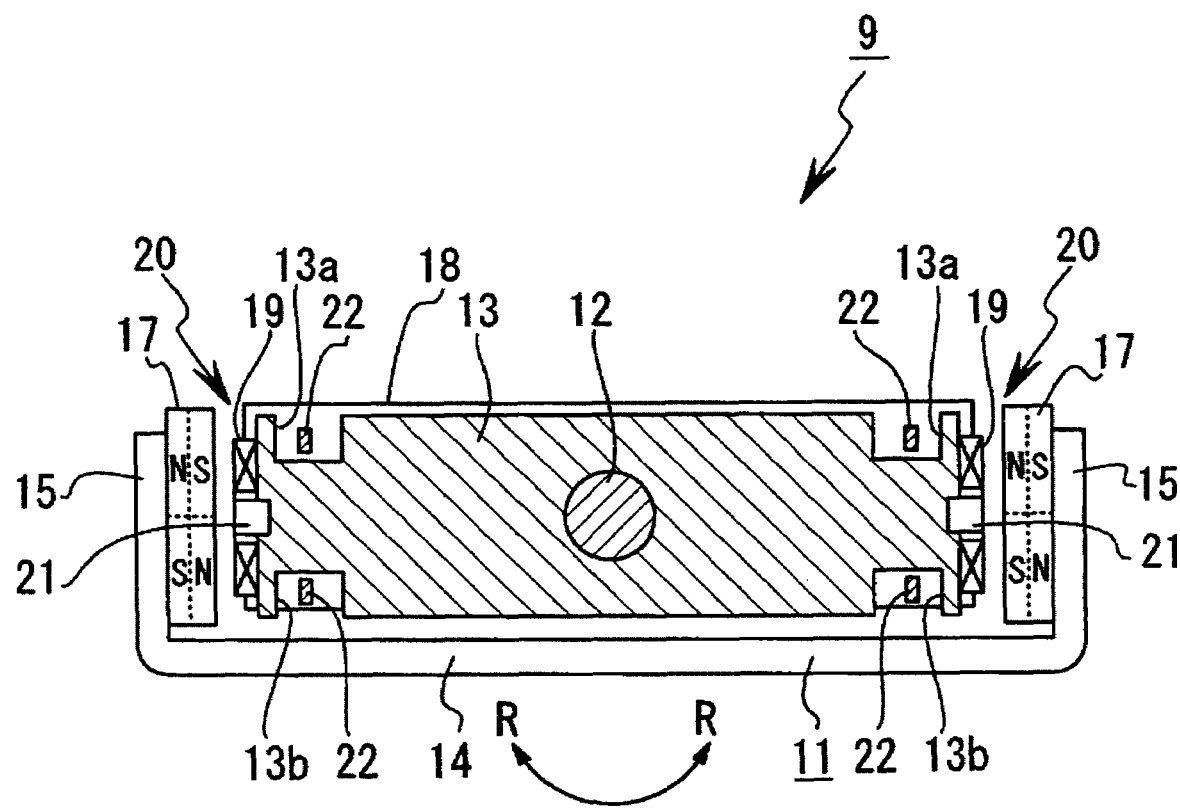
FIG. 4 is a sectional view taken along line IV-IV in FIG. 3.

The tilt drive section 13 having the circuit board 18 mounted thereto is rotatably supported at the stationary section 11 by insertion of the supporting shaft 12 into the central portion of the tilt drive section 13 (see FIGS. 2 to 4).

Tilt coils 19 and 19, which are wound into, for example, a rectangular shape, are mounted to respective end surfaces of the tilt drive section 13 in the longitudinal direction. Therefore, the tilt coils 19 and 19 and the tilt magnets 17 and 17, which are mounted to the mounting portions 15 and 15 of the stationary section 11, oppose each other. Tilt magnetic circuits 20 and 20 including the tilt magnets 17 and 17 and the tilt coils 19 and 19 are formed at the supporting block 9.

Magnetic portions 21 and 21, which are neutral iron pieces, are mounted to the respective end surfaces of the tilt drive section 13 in the longitudinal direction so as to be disposed at the central portions of the respective tilt coils 19 and 19.

Drive current is supplied to the tilt coils 19 and 19 from a power supply (not shown) through the circuit board 18. When drive current is supplied to the tilt coils 19 and 19, a thrust is generated in the tilt magnetic circuits 20 in a predetermined direction in accordance with the direction of the drive current flowing in the tilt coils 19 and 19. This causes the tilt drive section 13 to rotate around the supporting shaft 12 with respect to the stationary section 11, so that the movable block 10 rotates integrally.

Supporting springs 22, which have the shape of elongated plates, are mounted to the circuit board 18 mounted to the tilt drive section 13 so that ends of the supporting springs 22 are separated from each other. The supporting springs 22 pass through the respective clearance slits 13a and 13a and 13b and 13b of the tilt drive section 13 and protrude therefrom so as to face the shaft-forming portion 16 of the stationary section 11.

Drive current is supplied to the supporting springs 22 from a power supply (not shown) through the circuit board 18.

The other ends of the supporting springs 22 are mounted to predetermined portions of the movable block 10. Therefore, the movable block 10 and the supporting block 9 are connected together with the supporting springs 22, with the movable block 10 being held in a hollow.

The movable block 10 has a body 23 and a coil bobbin 24 mounted to the body 23 (see FIGS. 2 and 3).

At the body 23, a lens holder 25 and a bobbin-mounting section 26 are integrally formed. The bobbin-mounting section 26 has a U shape with an open portion at the side of the lens holder 25 in plan view.

An objective lens 27 is mounted to and held by the lens holder 25.

The coil bobbin 24 is mounted to the bobbin-mounting section 26 so as to be disposed in the space in the bobbin-mounting section 26. In the coil bobbin 24, a focusing coil winding section 24a and tracking coil winding sections 24b and 24b are integrally formed. The focusing coil winding section 24a has a rectangular shape. The tracking coil winding sections 24b and 24b are separated from each other and protrude from a surface of the focusing coil winding section 24a. A focusing coil 28 is wound upon the focusing coil winding section 24a, and tracking coils 29 and 29 are wound upon the respective tracking coil winding sections 24b and 24b.

The coil bobbin 24 is mounted to the bobbin-mounting section 26 so that the axial direction of the focusing coil winding section 24a is in the vertical direction and so that the tracking coil winding sections 24b and 24b oppose the lens-holding section 25.

When the coil bobbin 24 is mounted to the bobbin-mounting section 26, a space of a predetermined size is formed between the coil bobbin 24 and the lens-holding section 25.

A yoke 30 and a magnet 31, mounted to the yoke 30, are disposed in a space in the coil bobbin 24 by being inserted from below it. A yoke 32 is disposed in the space between the coil bobbin 24 and the lens-holding section 25 by being inserted from below it. The magnet 31 and the yoke 32 oppose each other, with the tracking coils 29 and 29 being disposed therebetween. The lower ends of the yokes 30 and 32 are connected, with the connected portion being mounted to, for example, the movable base 7.

Drive current is supplied to the focusing coil 28 and the tracking coils 29 and 29 from a power supply through the circuit board 18 and the supporting springs 22. When the drive current is supplied to the focusing coil 28, a thrust is generated in a predetermined direction in accordance with the direction of the drive current flowing in the focusing coil 28, causing the movable block 10 to move with respect to the tilt drive section 13 in the F directions as indicated by a double-headed arrow shown in FIG. 2, that is, in focusing directions corresponding to the directions in which the movable block 10 moves into contact with and separates from a recording surface of the disc-shaped recording medium 100 mounted to the disc table 3. On the other hand, when the drive current is supplied to the tracking coils 29 and 29, a thrust is generated in a predetermined direction in accordance with the direction of the drive current flowing in the tracking coils 29 and 29, causing the movable block 10 to move with respect to the tilt drive section 13 in the T directions indicated by a double-headed arrow shown in FIG. 2, that is, in tracking directions corresponding to substantially radial directions of the disc-shaped recording medium 100 mounted to the disc table 3.

When the movable block 10 moves in the focusing and tracking directions, the supporting springs 22 are resiliently displaced.

In the disc drive apparatus 1 having such a structure, when the disc table 3 is rotated by rotation of the spindle motor, the disc-shaped recording medium 100 mounted to the disc table 3 is rotated. At the same time, the optical pickup 6 moves in a radial direction of the disc-shaped recording medium 100, so that a recording operation or a reproducing operation is performed on the disc-shaped recording medium 100.

In the recording and reproducing operations, when drive current is supplied to the focusing coil 28, the movable block 10 of the objective lens drive device 8 moves, as described above, with respect to the tilt drive section 13 in the focusing directions F, so that focusing adjustment is performed in such a manner that a spot of a laser beam is focused on a recording track of the disc-shaped recording medium 100. The laser beam is emitted from a semiconductor laser (not shown), and is used to irradiate the disc-shaped recording medium 100 through the objective lens 27. When drive current is supplied to the tracking coils 29 and 29, the movable block 10 of the objective lens drive device 8 moves, as described above, with respect to the tilt drive section 13 in the tracking directions T, so that tracking adjustment is performed in such a manner that a spot of a laser beam is focused on a recording track of the disc-shaped recording medium 100. The laser beam is emitted from a semiconductor laser (not shown), disposed on the movable base 7, and is used to irradiate the disc-shaped recording medium 100 through the objective lens 27.

In the recording and reproducing operations performed on the disc-shaped recording medium 100, tilting adjustment is carried out at the same time that the focusing and tracking adjustments are carried out. The tilt adjustment is performed when, for example, a surface of the disc-shaped recording medium 100 that is rotating is deflected. It is performed by integrally rotating the tilt drive section 13 and the movable block 10 with respect to the stationary section 11 in directions R indicated by a double-headed arrow shown in FIGS. 2 and 4 so as to follow the disc-shaped recording medium 100.

As described above, the tilt drive section 13 is operated by generating a thrust in a predetermined direction in the tilt magnetic circuits 20 and 20 in accordance with the direction of the drive current supplied to the tilt coils 19 and 19 from a power supply through the circuit board 18.

In the disc drive apparatus 1, when the tilt adjustment is not carried out, the tilt drive section 13 is disposed at a neutral position in the directions R indicated by the double-headed arrow shown in FIG. 4, that is, at a position where it is disposed in a parallel state on the base 14 of the stationary section 11.

The tilt drive section 13 is retained at the neutral position as a result of attraction of the magnetic portions 21 and 21, mounted to the respective end surfaces of the tilt drive section 13, to the central portions of the respective tilt magnets 17 and 17.

As described above, in the disc drive apparatus 1, since the tilt magnetic circuits 20 and 20 are formed at the supporting block 9 to carry out tilt adjustment, supporting springs for connecting the movable block 10 and the tilt drive section 13 for supplying electrical current for tilt driving are not required, thereby making it possible to connect the movable block 10 and the tilt drive section 13 with the four supporting springs 22.

Therefore, the supporting block 9 and the movable block 10 do not lose balance, as a result of which it is possible to move the movable block 10 with respect to the supporting block 9 with the supporting block 9 and the movable block 10 being properly balanced, and to increase followability of a laser beam spot with respect to a recording track of the disc-shaped recording medium 100 while ensuring good characteristics of the objective lens drive device 8.

Since the tilt coils 19 and 19 are disposed at the supporting block 9 and the focusing coil 28 and the tracking coils 29 and 29 are disposed at the movable block 10, so that these coils are distributed among the blocks, it is possible to reduce the size and thickness of the disc drive apparatus 1 as a result of reducing the size and thickness of the objective lens drive device 8 and to easily assemble the objective lens drive device 8.

Since the movable block 10 is supported by the four supporting springs 22, it is not necessary to increase the resiliency of the supporting springs 22, so that reproducing and recording errors of information signals caused by a reduction in drive resonance frequency will not occur.

Since the tilt coils 19 and 19 and the tilt magnets 17 and 17 are not disposed at the movable block 10, the weight of the movable block 10 is not increased, so that the movable block 10 has a high sensitivity.

In particular, by disposing the tilt coils 19 and 19 at the tilt drive section 13, and the tilt magnets 17 and 17 at the stationary section 11, the weight of tilt drive section 13 does not become greater than is necessary, so that the sensitivity of the tilt drive section 13 can be increased.

Since the objective lens drive device 8 has the magnetic portions 21 and 21 which retain the tilt drive section 13 at the neutral position by being attracted to the central portions of the tilt magnets 17 and 17, the tilt drive section 13 can be reliably retained at the neutral position using a simple structure, thereby making it possible to stabilize the operating state of the tilt drive section 13.

Although, in the objective lens drive device 8, the supporting shaft 12 is disposed at the stationary section 11, it is possible to dispose the supporting shaft 12 in a protruding manner from the tilt drive section 13 and form a supporting hole, which receives the supporting shaft 12, in the shaft-forming portion 16, so that the tilt drive section 13 rotates with respect to the stationary section 11. However, when the supporting shaft 12 is disposed in a protruding manner from the tilt drive section 13 and a supporting hole is formed in the shaft-forming section 16, it is necessary to increase the thickness of the shaft-forming portion 16 in the axial direction of the supporting shaft 12 to stably support the tilt drive section 13. Therefore, when the supporting shaft 12 is disposed at the stationary section 11, the objective lens drive device 8 can be reduced in size.

Although, in the description above, the magnetic portions 21 and 21 are disposed as means for retaining the tilt drive section 13 at the neutral position, the tilt drive section 13 may be retained at the neutral position by interposing neutral springs between the base 14 of the stationary section 11 and the tilt drive section 13 instead of using the magnetic portions 21 and 21. (See FIGS. 5 and 6.)

Figure 5:
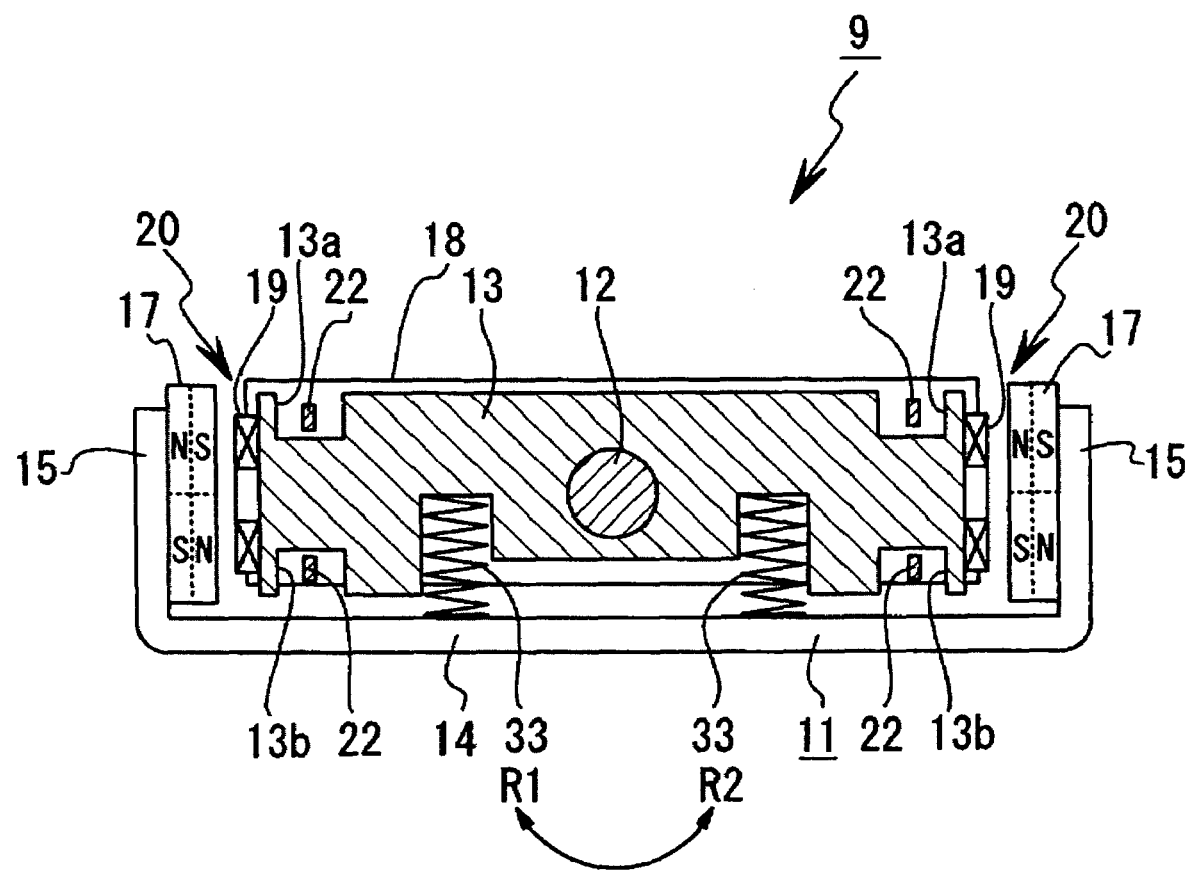
FIG. 5 is an enlarged sectional view of an example in which coil springs are used as means for holding a tilt drive section at a neutral position.

FIG. 5 shows an example in which coil springs are used as first and second neutral springs 33, with at least one end portion of each neutral spring 33 being mounted to either the tilt drive section 13 or the base 14. The neutral springs 33 may be helical compression springs or helical extension springs. When the tilt drive section 13 is rotated in the direction of R1, the first neutral spring 33 is stretched and the second neutral spring 33 is compressed. On the other hand, when the tilt drive section 13 is rotated in the direction of R2, the second neutral spring 33 is stretched and the first neutral spring 33 is compressed. When tilting adjustment is not performed, the amounts of compression of both the neutral springs 33 and 33 are the same, so that the tilt drive section 13 is retained at the neutral position.

Figure 6:
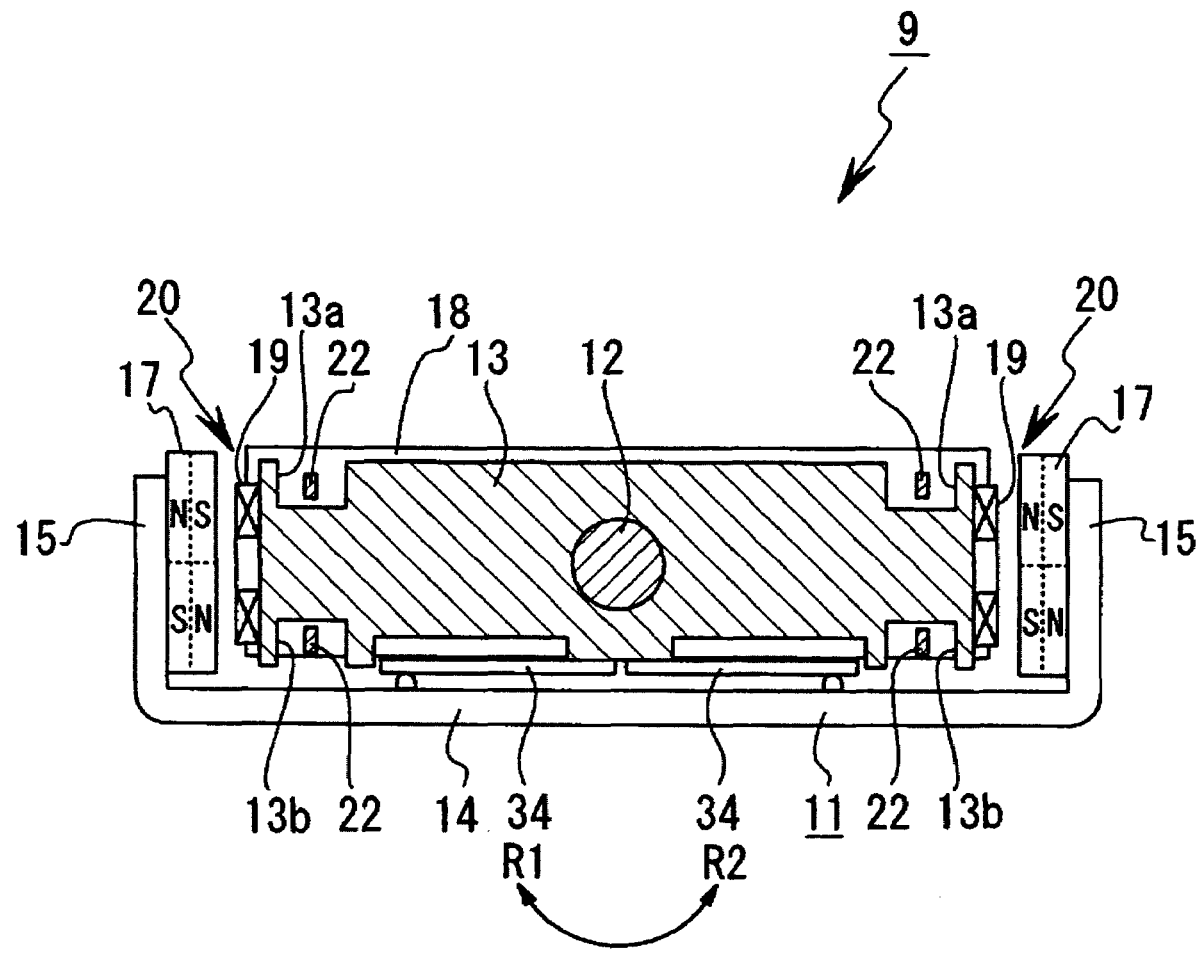
FIG. 6 is an enlarged sectional view of an example in which plate springs are used as means for holding the tilt drive section at a the neutral position.

FIG. 6 shows an example in which plate springs are used as first and second neutral springs 34 and 34, with at least one end portion of each neutral spring 34 being mounted to either the tilt drive section 13 or the base 14. When the tilt drive section 13 is rotated in the direction of R1, only the first neutral spring 34 is flexed. On the other hand, when the tilt drive section 13 is rotated in the direction of R2, only the second neutral spring 34 is flexed. When tilt adjustment is not performed, the amounts of flexing of both the neutral springs 34 and 34 are the same, or neither of them are flexed, so that the tilt drive section 13 is retained at the neutral position.

Even if the neutral springs 33 and 33 or the neutral springs 34 and 34 are used to retain the tilt drive section 13 at the neutral position as described above, the tilt drive section 13 can be reliably retained at the neutral position using a simple structure, thereby making it possible to stabilize the operating state of the tilt drive section 13.

Although, in the foregoing description, two neutral springs 33 and 33 or neutral springs 34 and 34 are used, any number of neutral springs 33 or neutral springs 34 may be used. For example, the tilt drive section 13 can be retained at the neutral position by disposing one neutral spring 33 or one neutral spring 34 at the central portion of the tilt drive section 13 in the longitudinal direction.

Respective ends of the neutral springs 33 or the neutral springs 34 may be mounted to the tilt drive section 13 and the base 14. When the respective ends are mounted to the tilt drive section 13 and the base 14, the tilt drive section 13 can be retained at the neutral position in the axial direction of the supporting shaft 12 in addition to being capable of being retained at the neutral position in the direction of rotation of the tilt drive section 13.

Figure 7:
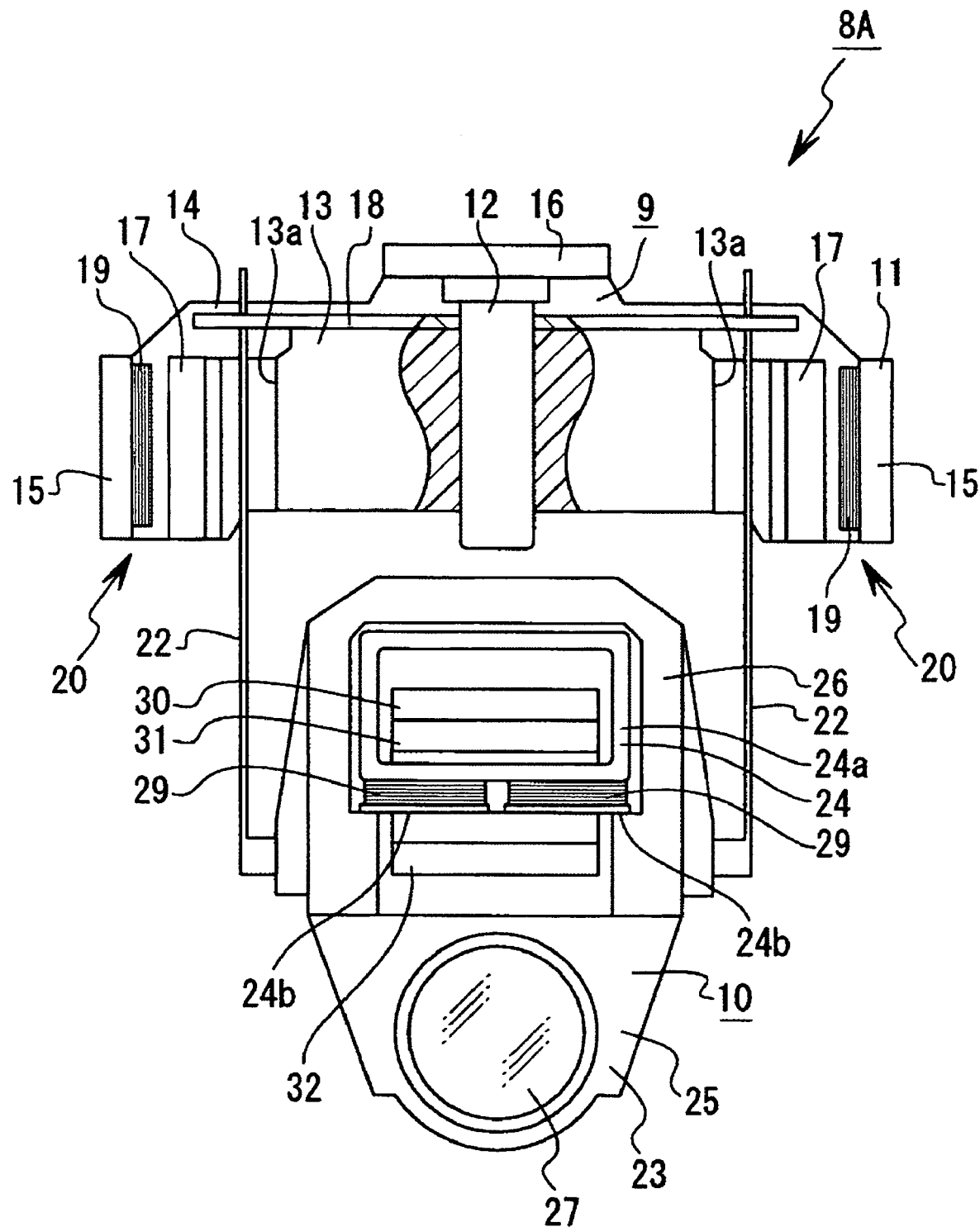
FIG. 7 illustrates a second embodiment of the present invention, and is an enlarged plan view showing a portion of the objective lens drive device in cross section.

A description of a second embodiment of the present invention will be given (see FIG. 7). The second embodiment described below only differs from the first embodiment in the positions of tilt coils 19, tilt magnets 17, and magnetic portions 21. Therefore, only the difference will be described in detail. Parts corresponding to those of the first embodiment are given the same reference numerals and will not be described below.

In an objective lens drive device 8A used in the second embodiment, tilt coils 19 and 19 are mounted to opposing surfaces of mounting portions 15 and 15 of a stationary section 11. Magnetic portions 21 and 21, which are neutral iron pieces, are mounted to opposing surfaces of the mounting portions 15 and 15 of the stationary section 11 so as to be disposed at the central portions of the tilt coils 19 and 19.

Tilt magnets 17 and 17 are mounted to respective end surfaces of the tilt drive section 13 in the longitudinal direction.

When drive current is supplied to the tilt coils 19 and 19 from a power supply, a thrust is generated in tilt magnetic circuits 20 and 20 in a predetermined direction in accordance with the direction of the drive current flowing in the tilt coils 19 and 19. This causes the tilt drive section 13 and the movable block 10 to rotate integrally around the supporting shaft 12 with respect to the stationary section 11. Therefore, when, for example, the surface of a disc-shaped recording medium 100 is deflected during rotation, the tilt drive section 13 rotates with respect to the stationary section 11 so as to follow the disc-shaped recording medium 100, so that tilt adjustment is performed.

The tilt drive section 13 is retained at the neutral position as a result of attraction of the central portions of the tilt magnets 17 and 17 to the magnetic portions 21 and 21, mounted to the respective mounting portions 15 and 15 of the stationary section 11.

As described above, since, in the objective lens drive device 8A, the tilt magnets 17 and 17 are disposed at the tilt drive section 13, and the tilt coils 19 and 19 are disposed on the stationary section 11, the tilt coils 19 and 19 are not disposed on the tilt magnets 17 and 17 that are rotated. Therefore, it is easy to route a supply line to the tilt coils 19 and 19, and to easily assemble the objective lens drive device BA.

As in the objective lens drive device 8, even in the objective lens drive device BA used in the second embodiment, the tilt drive section 13 may be retained at the neutral position using the neutral springs 33 and 33 or the neutral springs 34 and 34 instead of using the magnetic portions 21 and 21.

Next, a third embodiment will be described (see FIGS. 8 to 14). The third embodiment to be described below differs from the first embodiment only in that tilt magnets 17 are disposed at different positions, a bearing and a magnetic member are disposed, and a flexible printed circuit board is used for power supply. Therefore, only the differences will be described in detail. Corresponding parts to those of the first embodiment are given the same reference numerals and will not be described below.

An objective lens drive device BB used in the third embodiment comprises a supporting block 9B and a movable block 10, which moves with respect to the supporting block 9B. (See FIGS. 8 and 9.) The supporting block 9B comprises a stationary section 11, secured to the movable base 7, and a tilt drive section 13B, rotatably supported at the stationary section 11 through a supporting shaft 12B.

Tilt magnets 17B and 17B are mounted to opposing surfaces of mounting portions 15 and 15 of the stationary section 11. Tilt coils 19 and 19 and the tilt magnets 17B and 17B are mounted to and positioned at respective side surfaces of the tilt drive section 13B so as to oppose each other. Tilt magnetic circuits 20B and 20B, including the respective tilt magnets 17B and 17B and the respective tilt coils 19 and 19, are formed at the supporting block 9B.

Figure 9:
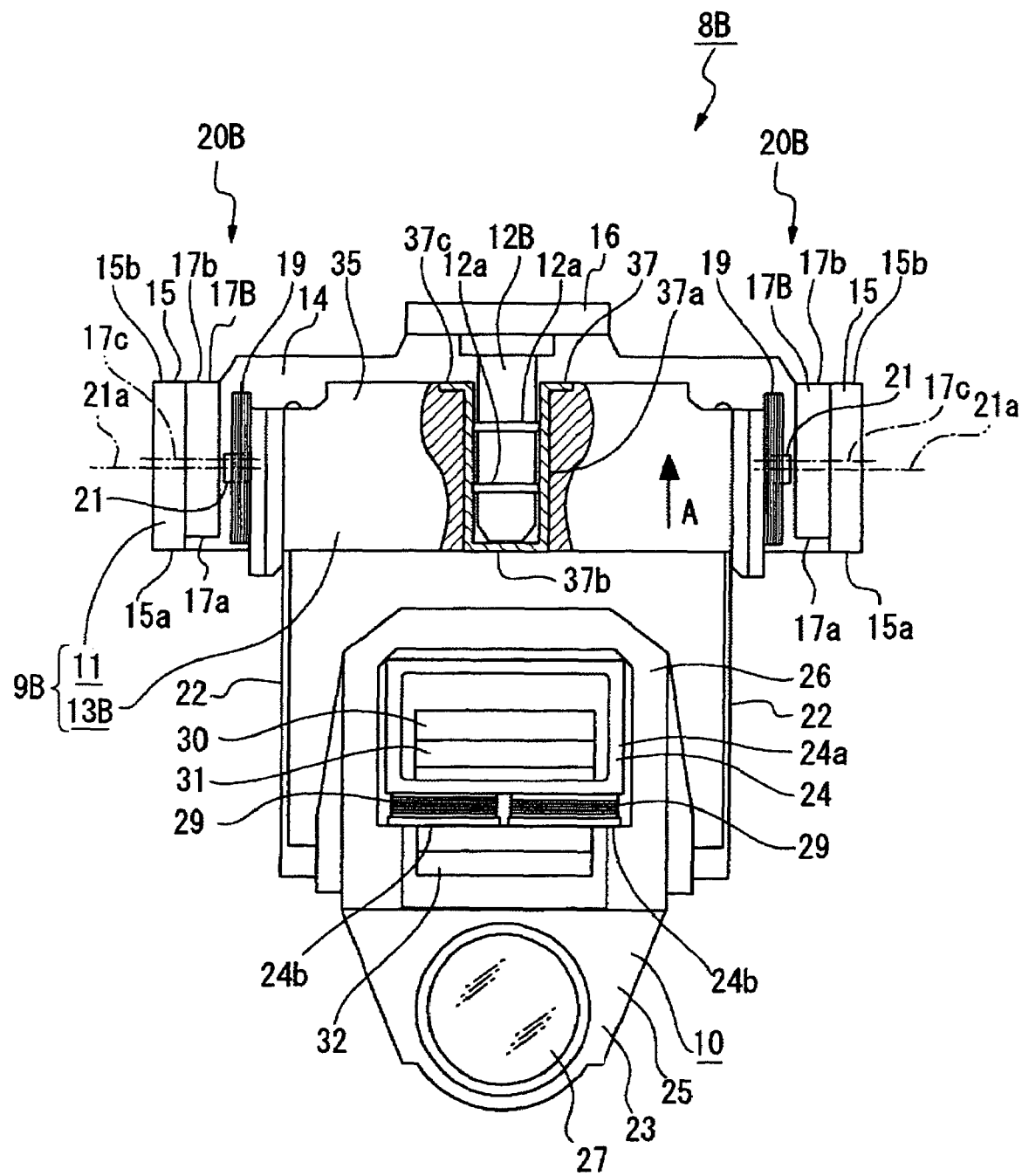
FIG. 9 is an enlarged plan view showing a portion of the objective lens drive device in cross section without a flexible printed circuit board.

The tilt magnets 17B and 17B have, for example, two magnetic poles. As shown in FIG. 9, end surfaces 17a and 17a, which are disposed towards the front in a thrust direction that corresponds to the axial direction of the supporting shaft 12B, are disposed slightly behind front end surfaces 15a and 15a of the respective mounting portions 15 and 15. End surfaces 17b and 17b, disposed towards the back in the thrust direction, are flush with back end surfaces 15b and 15b of the mounting portions 15 and 15. Central lines 17c and 17c in the thrust direction of the tilt magnets 17B and 17B are disposed slightly behind central lines 21a and 21a in the thrust direction of magnetic portions 21 and 21 at the central portions of the respective tilt coils 19 and 19.

In this way, since, in the objective lens drive device 8B, the central lines 17c and 17c of the tilt magnets 17B and 17B are disposed slightly behind the central lines 21a and 21a of the respective magnetic portions 21 and 21, the central portions of the magnetic portions 21 and 21 are attracted to the central portions of the tilt magnets 17B and 17B, so that the tilt drive section 13B is urged backwards (in the direction of arrow A shown in FIG. 9) with respect to the stationary section 11.

Figure 10:
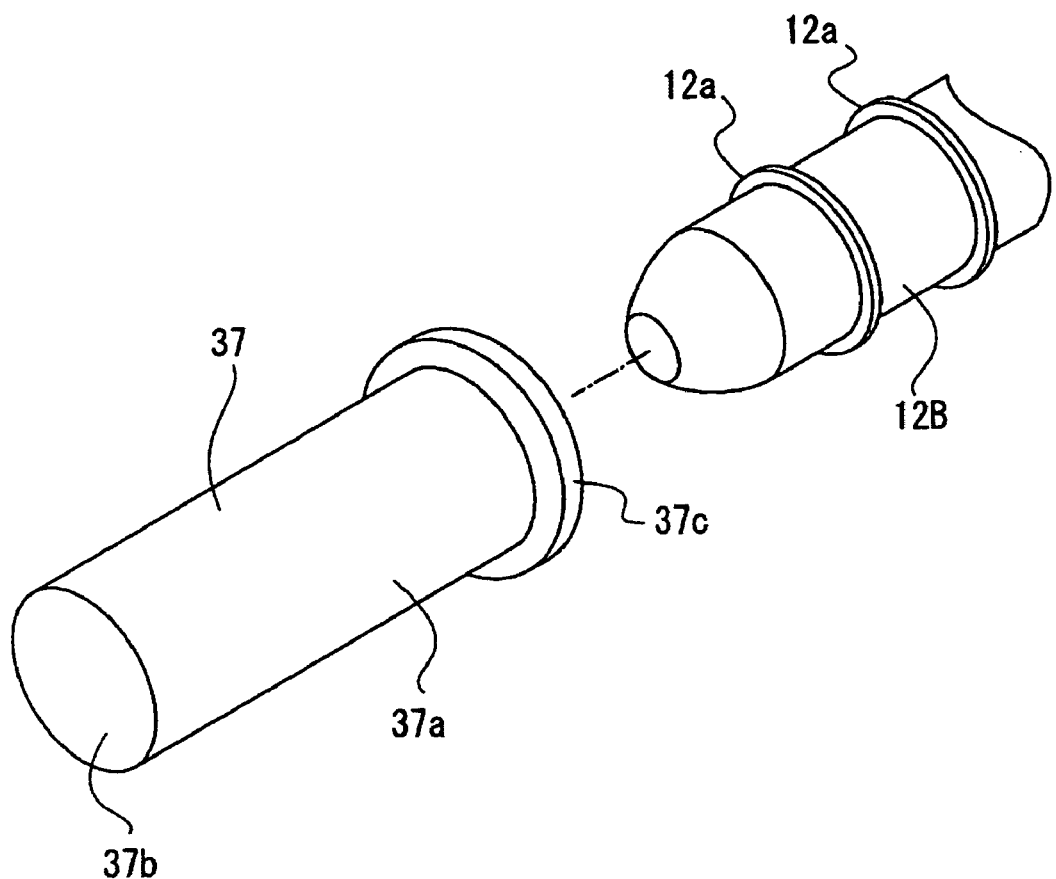
FIG. 10 is an enlarged perspective view of a supporting shaft and a bearing.
Figure 11:
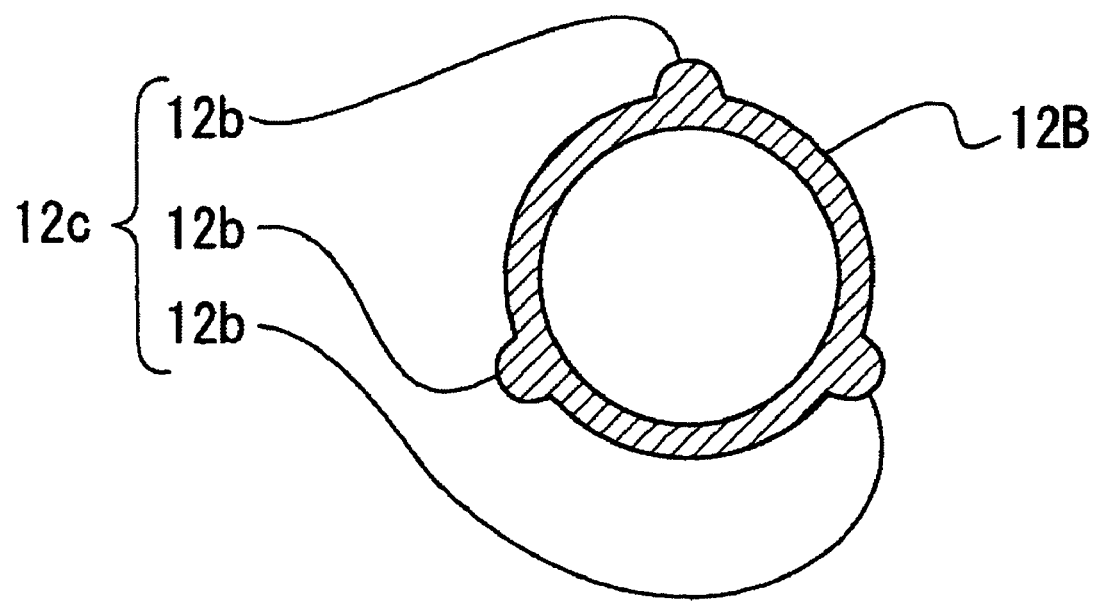
FIG. 11 is an enlarged sectional view of the supporting shaft having a sliding protrusion comprising a plurality of protruding portions.

The supporting shaft 12B is formed of, for example, a magnetic material, such as stainless steel (SUS), with sliding protrusions 12a and 12a, which are, for example, annular, being disposed at the outer peripheral surface of the supporting shaft 12B apart from each other (see FIG. 10). The sliding protrusions, which are disposed at the supporting shaft 12B, do not have to be annular. For example, as shown in FIG. 11, the supporting shaft 12B may have sliding protrusions 12c and 12c comprising a plurality of protruding portions 12b that are separated from each other in the peripheral direction.

The tilt drive section 13B is formed by mounting a magnet member 36 and a bearing 37 to a body 35. The body 35 is formed of, for example, liquid crystal polymer, and has a rectangular parallelepiped shape that is long in the same direction that the base 14 is long. One end of each supporting spring 22 is embedded in the body 35.

Figure 8:
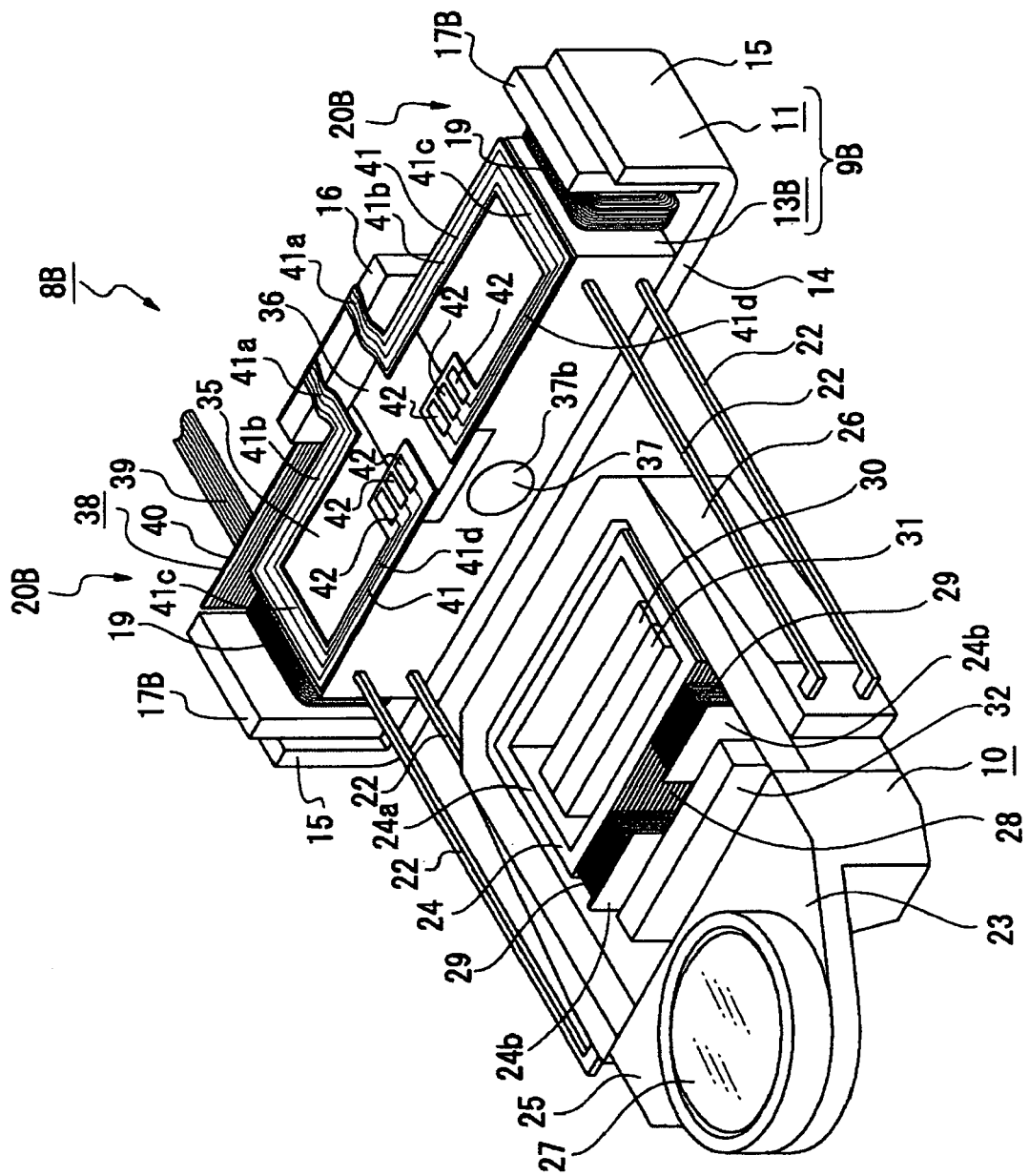
FIG. 8 illustrates a third embodiment of the present invention along with FIGS. 9 to 14, and is an enlarged perspective view of an objective lens drive device.

The magnet member 36 is mounted to the upper surface of the central portion of the body 35 in the longitudinal direction, and is long in the thrust direction (see FIG. 8). The magnet member 36 is attracted downward to the supporting shaft 12B. In order for the entire magnet member 36 to be attracted to the supporting shaft 12B, it is desirable for the magnet member 36 to be long in the thrust direction.

The bearing 37 is disposed right below the magnet member 36. As shown in FIGS. 9 and 10, the bearing 37 comprises a radial receiver 37a, a thrust receiver 37b, and a flange 37c, which are integrally formed of high polymer material. The radial receiver 37a has a cylindrical shape that is long in the thrust direction. The thrust receiver 37b is disposed at the front end of the radial receiver 37a. The flange 37c is disposed at the back end of the radial receiver 37a. Examples of high polymer material of the bearing 37 are polyamide, polyimide, and polyphenylene sulfide (PPS).

The supporting shaft 12B, disposed at the stationary section 11, is inserted in the bearing 37. In the state in which the supporting shaft 12B is inserted in the bearing 37, as shown in FIG. 9, the sliding protrusions 12a and 12a are in sliding contact with the inner surface of the radial receiver 37a of the bearing 37, and an end surface of the supporting shaft 12B is in sliding contact with the inner surface of the thrust receiver 37b.

As described above, since, in the objective lens drive device 8B, the central lines 17c and 17c of the tilt magnets 17B and 17B are positioned slightly behind the central lines 21a and 21a of the respective magnetic portions 21 and 21 to urge the tilt drive section 13B backwards (in the direction of arrow A in FIG. 9) with respect to the stationary section 11, the end surface of the supporting shaft 12B is reliably in contact with the inner surface of the thrust receiver 37b of the bearing 37. Therefore, the positions of the tilt drive section 13B, the stationary section 11, and the movable block 10 do not vary with respect to each other in the thrust direction, thereby making it possible to stabilize the operating states thereof.

Since the magnet member 36, disposed at the tilt drive section 13B, is attracted downward to the supporting shaft 12B, the tilt drive section 13B does not tilt with respect to the supporting shaft 12B, thereby stabilizing the rotational motion of the tilt drive section 13B.

Since the sliding protrusions 12a and 12a, which are in sliding contact with the inner peripheral surface of the bearing 37, are disposed at the outer peripheral surface of the supporting shaft 12B, the coefficient of friction between the supporting shaft 12B and the bearing 37 is small, so that the rotational motion of the tilt drive section 13B can be made smoother.

Since the bearing 37 is formed of high-polymer material, such as polyamide, polyimide, or polyphenylene sulfide, the slidability of the bearing 37 with respect to the supporting shaft 12B is good, so that the rotational motion of the tilt drive section 13B can be made even smoother.

The bearing 37 comprises the thrust receiver 37b, so that contact between the thrust receiver 37b and the end surface of the supporting shaft 12B positions the tilt drive section 13B with respect to the supporting shaft 12B in the thrust direction, thereby stabilizing the operating states thereof.

In the objective lens drive device 8B, drive current is supplied to the tilt coils 19 and 19 through a flexible printed circuit board 38. Drive current is supplied to tracking coils 29 and 29 and a focusing coil 28 through the flexible printed circuit board 38 and the supporting springs 22.

Figure 12:
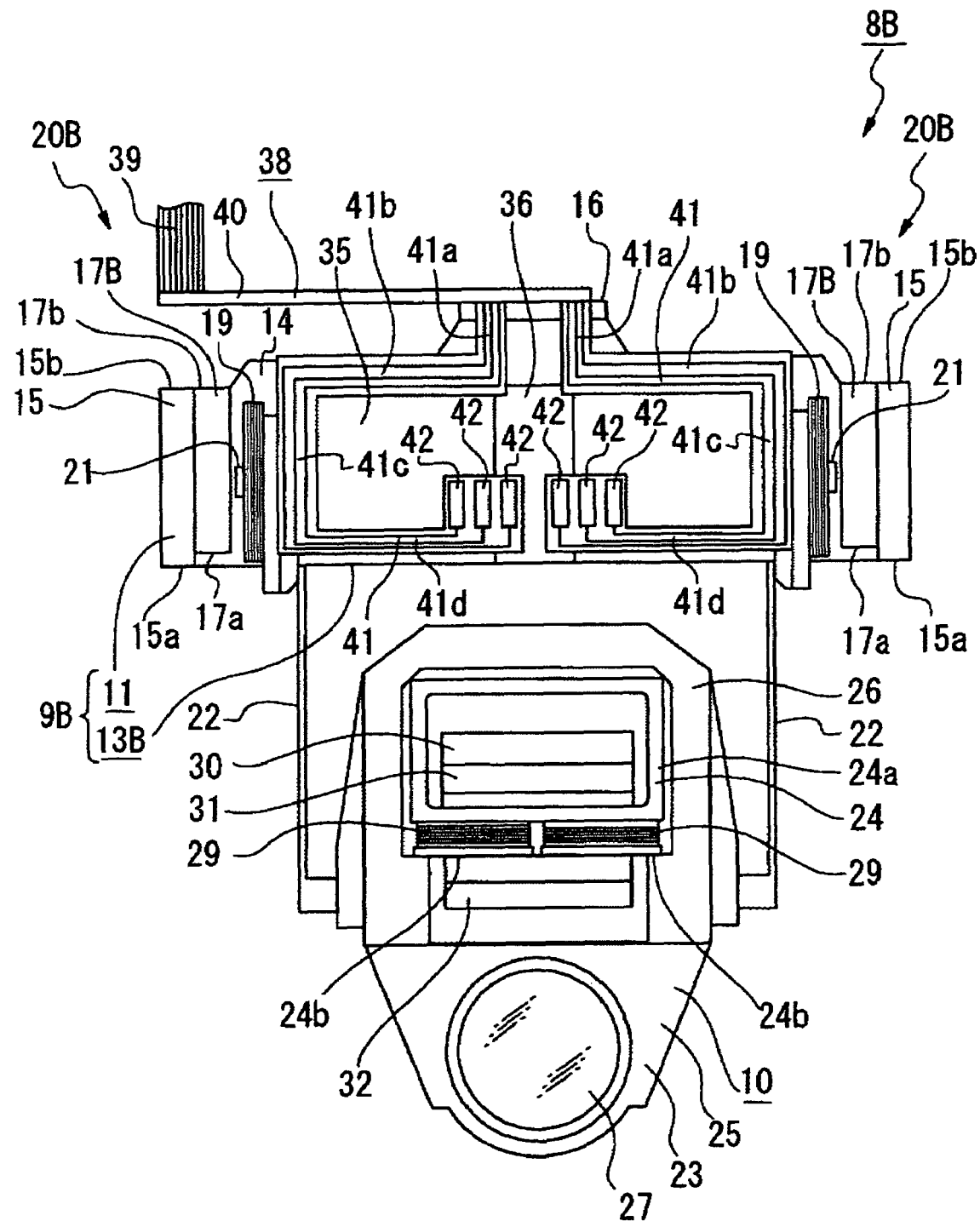
FIG. 12 is an enlarged plan view of the objective lens drive device.

In the flexible printed circuit board 38, a power-source-side electrically conductive section 39, an intermediate electrically conductive section 40, and device-side electrically conductive sections 41 and 41 are disposed continuously in that order (see FIG. 12). The power-supply-side electrically conductive section 39 and the device-side electrically conductive sections 41 and 41 are disposed in the vertical direction, and the intermediate electrically conductive section 40 is disposed in the forward-and-backward direction.

The intermediate electrically conductive section 40 is disposed at the back of the tilt drive section 13B along the longitudinal direction of the tilt drive section 13B. Its end portion adjacent the device-side electrically conductive sections 41 and 41 is mounted to the back surface of a shaft-forming section 16 of the stationary section 11.

The device-side electrically conductive sections 41 and 41 branch from the intermediate electrically conductive section 40, and are disposed on the top surface of the tilt drive section 13B, excluding a portion of each of the device-side electrically conductive sections 41 and 41. In each device-side electrically conductive section 41, starting from the side closest the intermediate electrically conductive section 40, a base end portion 41a, a first extending section 41b, a connecting section 41c, and a second extending section 41d are continuously formed. Electrodes 42 are formed at ends of the second extending sections 41d and 41d. The electrodes 42 are electrically connected to the tilt coils 19 and 19 or the supporting springs 22.

In the device-side electrically conductive sections 41 and 41, the base end portions 41a protrude forward from the intermediate electrically conductive section 40, the first extending sections 41b and 41b are formed long towards the leftward-and-rightward direction, the connecting sections 41c and 41c are formed long in the forward-and-backward direction, and the second extending sections 41d and 41d are formed long in the leftward-and-rightward direction. The first extending sections 41b and 41b are disposed along the back edge of the tilt drive section 13B, the connecting sections 41c and 41c are disposed along the respective left and right edges of the tilt drive section 13B, and the second extending sections 41d and 41d are disposed along the front edge of the tilt drive section 13B.

In the device-side electrically conductive sections 41 and 41, one end of each second extending section 41d is secured to the tilt drive section 13 with, for example, an adhesive, and the other end is not secured to the tilt drive section 13.

With the thrust receiver 37b of the bearing 37 and the end surface of the supporting shaft 12B being in contact with each other, the base end portions 41a and 41a are flexed to be deformable when the tilt drive section 13B rotates. Although the tilt drive section 13B may, as a result of vibration or the like, move forward, that is, move in a direction in which it is dislodged from the supporting shaft 12B, the tilt drive section 13B can only move forward by an amount corresponding to the amount of flexing of the base end portions 41a and 41a of the flexible printed circuit board 38. Therefore, since, here, the base end portions 41a and 41a function as stoppers for preventing forward movement of the tilt drive section 13B, the tilt drive section 13B is prevented from getting dislodged from the supporting shaft 12B.

As described above, in the objective lens drive device 8B, only one end of the second extending section 41d of each device-side electrically conductive section 41 of the flexible printed circuit board 38 is secured to the tilt drive section 13B, and the other end is not secured to the tilt drive section 13B. Therefore, a load that is generated by opposing force of the flexible printed circuit board 38 that is generated when the tilt drive section 13B operates is small, so that it is possible to stabilize the rotary motion of the tilt drive section 13B.

In the objective lens drive device 8B, the bearing 37 for inserting the supporting shaft 12B is disposed at the tilt drive section 13B separately from the body 35. Therefore, a material having high slidability with respect to the supporting shaft 12B may be used as the material of the bearing 37, and, for example, a material having high moldability may be used as the material of the body 35. Consequently, it is possible to enhance functionality of each part.

Figure 13:
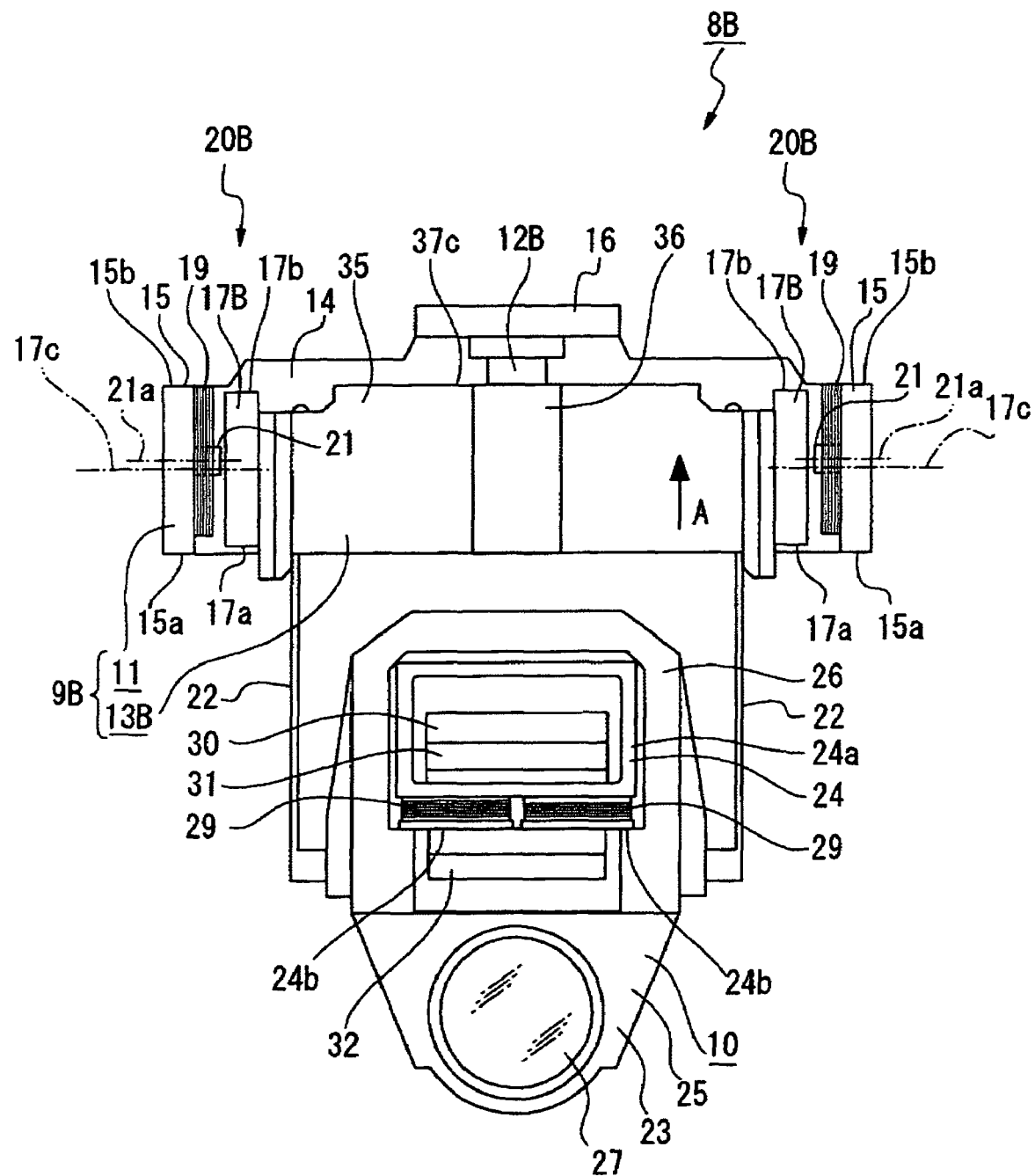
FIG. 13 is an enlarged plan view of an objective lens drive device having tilt coils mounted to a stationary section and having tilt magnets mounted to a tilt drive section.

Although, in the foregoing description, the objective lens drive device 8B having the tilt magnets 17B and 17B disposed at the stationary section 11 and having the tilt coils 19 and 19 and the magnetic portions 21 and 21 disposed at the tilt drive section 13B is described, an objective lens drive device, like the objective lens drive device 8A, having tilt magnets 17B and 17B disposed at a tilt drive section 13B and tilt coils 19 and 19 and magnetic portions 21 and 21 disposed at a stationary section 11 may also be used (see FIG. 13).

In this way, when the tilt magnets 17B and 17B are disposed at the tilt drive section 13B, and the tilt coils 19 and 19 and the magnetic portions 21 and 21 are disposed at the stationary section 11, it is possible to urge the tilt drive section 13B backward (in the direction of arrow A in FIG. 13) with respect to the stationary section 11 as a result of positioning central lines 17c and 17c of the tilt magnets 17B and 17B slightly in front of central lines 21a and 21a of the respective magnetic portions 21. By urging the tilt drive section 13B backwards with respect to the stationary section 11, the positions of the tilt drive section 13B, the stationary section 11, and a movable block 10 do not vary with respect to each other in a thrust direction, so that the operating states thereof can be stabilized.

Figure 14:
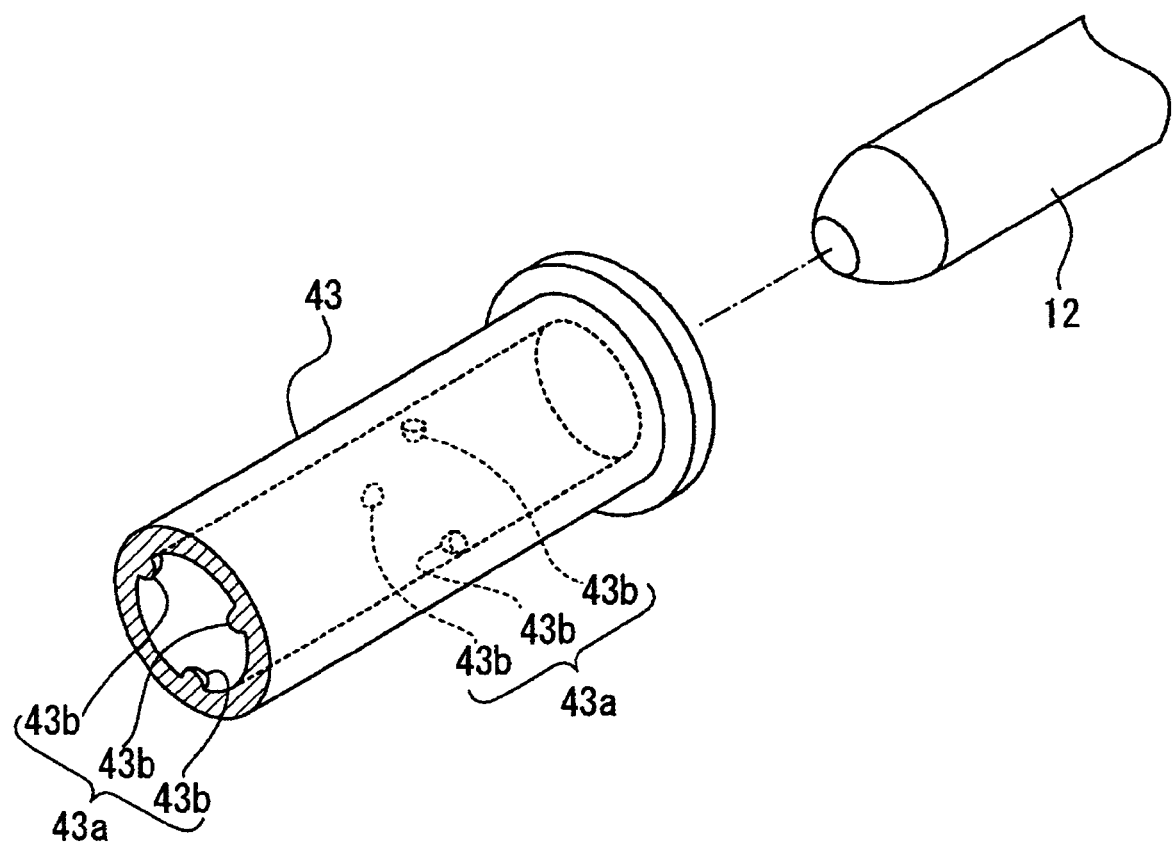
FIG. 14 is an enlarged perspective view showing in cross section a portion of the bearing having sliding protrusions.

The example in which the sliding protrusions 12a and 12a or sliding protrusions 12c and 12c are disposed at the outer peripheral surface of the supporting shaft 12B is described (see FIGS. 10 and 11). However, as shown in FIG. 14, it is possible to use a bearing 43 having sliding protrusions 43a and 43a on the inner peripheral surface, instead of disposing the sliding protrusions 12a and 12a at the supporting shaft. The sliding protrusions 43a and 43a are disposed apart from each other in the axial direction of the bearing 43. The sliding protrusions 43a each comprise, for example, a plurality of protruding portions 43b, 43b, and 43b that are disposed apart from each other in the peripheral direction.

In this way, even if the sliding protrusions 43a and 43a are disposed on the inner peripheral surface of the bearing 43, the coefficient of friction between the supporting shaft 12 and the bearing 43 is small, so that the rotational motion of the tilt drive section 13B can be made smooth.

The specific forms and structures of each part in each embodiment described above are only some practical examples when carrying out the present invention, so that these specific forms and structures shall not be construed as limiting the technical scope of the present invention.

INDUSTRIAL APPLICABILITY

As is clear from the foregoing description, the optical pickup of the present invention comprises a movable base moving in radial directions of a disc-shaped recording medium, which is mounted to a disc table; and an objective lens drive device disposed at the movable base. The objective lens drive device comprises a supporting block, a movable block, and a supporting spring, the movable block holding an objective lens and moving with respect to the supporting block in focusing directions and tracking directions, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block. The supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section.

Therefore, since it is not necessary to dispose supporting springs for connecting the movable block and the tilt drive section for supplying electrical current for tilt driving, the supporting block and the movable block do not lose balance, as a result of which it is possible to move the movable block with respect to the supporting block with the supporting block and the movable block being properly balanced, and to increase followability of a laser beam spot with respect to a recording track while ensuring good characteristics of the objective lens drive device.

Since the tilt coils are disposed at the supporting block and the focusing coil and the tracking coils are disposed at the movable block, so that these coils are distributed among the blocks, it is possible to reduce the size and thickness of the optical pickup as a result of reducing the size and thickness of the objective lens drive device and to easily assemble the objective lens drive device.

Since the supporting block and the movable block are connected with the minimum number of supporting springs required, it is not necessary to increase the resiliency of the supporting springs. Therefore, recording and reproducing errors of information signals caused by a reduction in the drive resonance frequency do not occur.

Since the tilt coils and the tilt magnets are not disposed at the movable block, the weight of the movable block is not increased, so that the movable block can have high sensitivity.

In the invention that is disclosed in claim 2, the tilt magnetic circuit includes a tilt coil and a tilt magnet that opposes the tilt coil, the tilt coil being disposed at the tilt drive section, and the tilt magnet being disposed at the stationary section. Therefore, it is possible to increase the sensitivity of the tilt drive section because the weight of the tilt drive section does not become greater than is necessary.

In the invention that is disclosed in claim 3, the tilt magnetic circuit includes a tilt coil and a tilt magnet that opposes the tilt coil, the tilt coil being disposed at the stationary section, and the tilt magnet being disposed at the tilt drive section. Therefore, it is easy to route a supply line to the tilt coils, and to achieve ease of assembly.

In the invention that is disclosed in claim 4, the supporting shaft is disposed at the stationary section. Therefore, it is not necessary to increase the thickness of the stationary section in the axial direction of the supporting shaft, so that it is possible to reduce the size of the optical pickup as a result of reducing the size of the objective lens drive device.

In the invention that is disclosed in claim 5, the optical pickup further comprises a magnetic portion disposed at the tilt drive section and retaining the tilt drive section at a neutral position in a direction of rotation of the tilt drive section by being attracted to the tilt magnet. Therefore, the tilt drive section can be reliably retained at the neutral position using a simple structure, thereby making it possible to stabilize the operating state of the tilt drive section.

In the invention that is disclosed in claim 6, the optical pickup further comprises a magnetic portion disposed at the stationary section and retaining the tilt drive section at a neutral position in a direction of rotation of the tilt drive section by attracting the tilt magnet. Therefore, the tilt drive section can be reliably retained at the neutral position using a simple structure, thereby making it possible to stabilize the operating state of the tilt drive section.

In the invention that is disclosed in claim 7, the optical pickup further comprises a neutral spring, disposed between the tilt drive section and the stationary section, for retaining the tilt drive section at a neutral position in a direction of rotation of the tilt drive section. Therefore, the tilt drive section can be reliably retained at the neutral position using a simple structure, thereby making it possible to stabilize the operating state of the tilt drive section.

In the invention that is disclosed in claim 8, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction. Therefore, the tilt drive section is urged with respect to the stationary section in the thrust direction, and the tilt drive section, the stationary section, and the movable block are kept at proper positions with respect to each other in the thrust direction, so that the operating states thereof can be stabilized.

In the invention that is disclosed in claim 9, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction. Therefore, the tilt drive section is urged with respect to the stationary section in the thrust direction, and the tilt drive section, the stationary section, and the movable block are kept at proper positions with respect to each other in the thrust direction, so that the operating states thereof can be stabilized.

In the invention that is disclosed in claim 10, the supporting shaft is formed of a magnetic material, and the tilt drive section comprises a magnet member disposed so as to oppose the supporting shaft in the focusing directions. Therefore, the magnet member is attracted to the supporting shaft in the focusing directions. Consequently, the tilt drive section does not tilt with respect to the supporting shaft, thereby making it possible to stabilize the rotational motion of the tilt drive section.

In the invention that is disclosed in claim 11, the tilt drive section further comprises a bearing for inserting the supporting shaft. Therefore, a material having high slidability with respect to the supporting shaft may be used as the material of the bearing. Consequently, it is possible to enhance functionality of the bearing.

In the invention that is disclosed in claim 12, the bearing is formed of a high-polymer material. Therefore, the bearing has good slidability with respect to the supporting shaft, so that the rotational motion of the tilt drive section can be made smoother.

In the invention that is disclosed in claim 13, when the axial direction of the supporting shaft is defined as a thrust direction, an outer peripheral surface of the supporting shaft or an inner peripheral surface of the bearing is provided with a plurality of sliding protrusions that are separated from each other in the thrust direction. Therefore, the coefficient of friction between the supporting shaft and the bearing is small, so that the rotational motion of the tilt drive section can be made smoother.

In the invention that is disclosed in claim 14, the bearing comprises a thrust receiver for receiving an end of the supporting shaft in the axial direction thereof. Therefore, contact between the thrust receiver and the end surface of the supporting shaft positions the tilt drive section with respect to the supporting shaft, so that the operating state of the tilt drive section can be stabilized.

In the invention that is disclosed in claim 15, the optical pickup further comprises a flexible printed circuit board for supplying electrical power to the focusing coil, tracking coil, and tilt coil. The flexible printed circuit board comprises an extending section disposed on the tilt drive section and extending in the tracking directions, with at least a portion of the extending section not being secured to the tilt drive section. Therefore, a load that is generated by opposing force of the flexible printed circuit board that is generated when the tilt drive section rotates is small, so that it is possible to stabilize the rotary motion of the tilt drive section.

The disc drive apparatus of the present invention comprises a disc table for mounting a disc-shaped recording medium; and an optical pickup for irradiating the disc-shaped recording medium, which is mounted to the disc table, with a laser beam through an objective lens. The optical pickup comprises a movable base moving in radial directions of the disc-shaped recording medium, which is mounted to the disc table; and an objective lens drive device disposed at the movable base. The objective lens drive device comprises a supporting block, a movable block, and a supporting spring, the movable block holding the objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, and the supporting spring connecting the supporting block and the movable block. The supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, and the tilt magnetic circuit rotating the tilt drive section with respect to the stationary section.

Therefore, since it is not necessary to dispose supporting springs for connecting the movable block and the tilt drive section for supplying electrical current for tilt driving, the supporting block and the movable block do not lose balance, as a result of which it is possible to move the movable block with respect to the supporting block with the supporting block and the movable block being properly balanced, and to increase followability of a laser beam spot with respect to a recording track while ensuring good characteristics of the objective lens drive device.

Since the tilt coils are disposed at the supporting block and the focusing coil and the tracking coils are disposed at the movable block, so that these coils are distributed among the blocks, it is possible to reduce the size and thickness of the disc drive apparatus as a result of reducing the size and thickness of the objective lens drive device and to easily assemble the objective lens drive device.

Since the supporting block and the movable block are connected with the minimum number of supporting springs required, it is not necessary to increase the resiliency of the supporting springs. Therefore, recording and reproducing errors of information signals caused by a reduction in the drive resonance frequency do not occur.

Since tilt coils and tilt magnets are not disposed at the movable block, the weight of the movable block is not increased, so that the movable block can have high sensitivity.

In the invention that is disclosed in claim 17, the tilt magnetic circuit includes a tilt coil and a tilt magnet that opposes the tilt coil, the tilt coil being disposed at the tilt drive section, and the tilt magnet being disposed at the stationary section. Therefore, it is possible to increase the sensitivity of the tilt drive section because the weight of the tilt drive section does not become greater than is necessary.

In the invention that is disclosed in claim 18, the tilt magnetic circuit includes a tilt coil and a tilt magnet that opposes the tilt coil, the tilt coil being disposed at the stationary section, and the tilt magnet being disposed at the tilt drive section. Therefore, it is easy to route a supply line to the tilt coils, and to achieve ease of assembly.

In the invention that is disclosed in claim 19, the supporting shaft is disposed at the stationary section. Therefore, it is not necessary to increase the thickness of the stationary section in the axial direction of the supporting shaft, so that it is possible to reduce the size of the disc drive apparatus as a result of reducing the size of the objective lens drive device.

In the invention that is disclosed in claim 20, the optical pickup further comprises a magnetic portion disposed at the tilt drive section and retaining the tilt drive section at a neutral position in a direction of rotation of the tilt drive section by being attracted to the tilt magnet. Therefore, the tilt drive section can be reliably retained at the neutral position using a simple structure, thereby making it possible to stabilize the operating state of the tilt drive section.

In the invention that is disclosed in claim 21, the optical pickup further comprises a magnetic portion disposed at the stationary section and retaining the tilt drive section at a neutral position in a direction of rotation of the tilt drive section by attracting the tilt magnet. Therefore, the tilt drive section can be reliably retained at the neutral position using a simple structure, thereby making it possible to stabilize the operating state of the tilt drive section.

In the invention that is disclosed in claim 22, the optical pickup further comprises a neutral spring, disposed between the tilt drive section and the stationary section, for retaining the tilt drive section at a neutral position in a direction of rotation of the tilt drive section. Therefore, the tilt drive section can be reliably retained at the neutral position using a simple structure, thereby making it possible to stabilize the operating state of the tilt drive section.

In the invention that is disclosed in claim 23, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction. Therefore, the tilt drive section is urged with respect to the stationary section in the thrust direction, and the tilt drive section, the stationary section, and the movable section are kept at proper positions with respect to each other in the thrust direction, so that the operating states thereof can be stabilized.

In the invention that is disclosed in claim 24, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction. Therefore, the tilt drive section is urged with respect to the stationary section in the thrust direction, and the tilt drive section, the stationary section, and the movable section are kept at proper positions with respect to each other in the thrust direction, so that the operating states thereof can be stabilized.

In the invention that is disclosed in claim 25, the supporting shaft is formed of a magnetic material, and the tilt drive section comprises a magnet member disposed so as to oppose the supporting shaft in the focusing directions. Therefore, the magnet member is attracted to the supporting shaft in the focusing directions. Consequently, the tilt drive section does not tilt with respect to the supporting shaft, thereby making it possible to stabilize the rotational motion of the tilt drive section.

In the invention that is disclosed in claim 26, the tilt drive section further comprises a bearing for inserting the supporting shaft. Therefore, a material having high slidability with respect to the supporting shaft may be used as the material of the bearing. Consequently, it is possible to enhance functionality of the bearing.

In the invention that is disclosed in claim 27, the bearing is formed of a high-polymer material. Therefore, the bearing has good slidability with respect to the supporting shaft, so that the rotational motion of the tilt drive section can be made smoother.

In the invention that is disclosed in claim 28, when the axial direction of the supporting shaft is defined as a thrust direction, an outer peripheral surface of the supporting shaft or an inner peripheral surface of the bearing is provided with a plurality of sliding protrusions that are separated from each other in the thrust direction. Therefore, the coefficient of friction between the supporting shaft and the bearing is small, so that the rotational motion of the tilt drive section can be made smoother.

In the invention that is disclosed in claim 29, the bearing comprises a thrust receiver for receiving an end of the supporting shaft in the axial direction thereof. Therefore, contact between the thrust receiver and the end surface of the supporting shaft positions the tilt drive section with respect to the supporting shaft, so that the operating state of the tilt drive section can be stabilized.

In the invention that is disclosed in claim 30, the optical pickup further comprises a flexible printed circuit board for supplying electrical power to the focusing coil, tracking coil, and tilt coil. The flexible printed circuit board comprises an extending section disposed on the tilt drive section and extending in the tracking directions, with at least a portion of the extending section not being secured to the tilt drive section. Therefore, a load that is generated by opposing force of the flexible printed circuit board that is generated when the tilt drive section rotates is small, so that it is possible to stabilize the rotary motion of the tilt drive section.

The invention claimed is:

1. An optical pickup comprising:
   a movable base moving in radial directions of a disc-shaped recording medium, which is mounted to a disc table; and an objective lens drive device disposed at the movable base, wherein the objective lens drive device comprises a supporting block, a movable block, and a supporting spring, the movable block holding an objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block, and wherein the supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section, and further comprising a flexible printed circuit board for supplying electrical power to the focusing coil, tracking coil, and tilt coil, the flexible printed circuit board comprising an extending section disposed on the tilt drive section and extending in the tracking directions, wherein at least a portion of the extending section is not secured to the tilt drive section.

2. An optical pickup according to claim 1, wherein the tilt magnetic circuit includes a tilt coil and a tilt magnet that opposes the tilt coil, the tilt coil being disposed at the tilt drive section, the tilt magnet being disposed at the stationary section.

3. An optical pickup according to claim 1, wherein the tilt magnetic circuit includes a tilt coil and a tilt magnet that opposes the tilt coil, the tilt coil being disposed at the stationary section, the tilt magnet being disposed at the tilt drive section.

4. An optical pickup according to claim 1, wherein the supporting shaft is disposed at the stationary section.

5. An optical pickup according to claim 2, further comprising a magnetic portion disposed at the tilt drive section, the magnetic portion retaining the tilt drive section at a neutral position in a direction of rotation of the tilt drive section by being attracted to the tilt magnet.

6. An optical pickup according to claim 3, further comprising a magnetic portion disposed at the stationary section, the magnetic portion retaining the tilt drive section at a neutral position in a direction of rotation of the tilt drive section by attracting the tilt magnet.

7. An optical pickup according to claim 1, further comprising a neutral spring, disposed between the tilt drive section and the stationary section, for retaining the tilt drive section at a neutral position in a direction of rotation of the tilt drive section.

8. An optical pickup according to claim 5, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

9. An optical pickup according to claim 6, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

10. An optical pickup according to claim 4, wherein the supporting shaft is formed of a magnetic material, and wherein the tilt drive section comprises a magnet member disposed so as to oppose the supporting shaft in the focusing directions.

11. An optical pickup according to claim 4, wherein the tilt drive section further comprises a bearing for inserting the supporting shaft.

12. An optical pickup according to claim 11, wherein the bearing is formed of a high-polymer material.

13. An optical pickup according to claim 11, wherein, when the axial direction of the supporting shaft is defined as a thrust direction, an outer peripheral surface of the supporting shaft or an inner peripheral surface of the bearing is provided with a plurality of sliding protrusions that are separated from each other in the thrust direction.

14. An optical pickup according to claim 11, wherein the bearing comprises a thrust receiver for receiving an end of the supporting shaft in the axial direction thereof.

15. A disc drive apparatus comprising:
a disc table for mounting a disc-shaped recording medium; and
an optical pickup for irradiating the disc-shaped recording medium, which is mounted to the disc table, with a laser beam through an objective lens,
wherein the optical pickup comprises a movable base moving in radial directions of the disc-shaped recording medium, which is mounted to the disc table; and an objective lens drive device disposed at the movable base,
wherein the objective lens drive device comprises a supporting block, a movable block, and a supporting spring, the movable block holding the objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block, and
wherein the supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section, and further comprising a flexible printed circuit board for supplying electrical power to the focusing coil, tracking coil, and tilt coil, the flexible printed circuit board comprising an extending section disposed on the tilt drive section and extending in the tracking directions, wherein at least a portion of the extending section is not secured to the tilt drive section.

16. A disc drive apparatus according to claim 15, wherein the tilt magnetic circuit includes a tilt coil and a tilt magnet that opposes the tilt coil, the tilt coil being disposed at the tilt drive section, the tilt magnet being disposed at the stationary section.

17. A disc drive apparatus according to claim 15, wherein the tilt magnetic circuit includes a tilt coil and a tilt magnet that opposes the tilt coil, the tilt coil being disposed at the stationary section, the tilt magnet being disposed at the tilt drive section.

18. A disc drive apparatus according to claim 15, wherein the supporting shaft is disposed at the stationary section.

19. A disc drive apparatus according to claim 16, further comprising a magnetic portion disposed at the tilt drive section, the magnetic portion retaining the tilt drive section at a neutral position in a direction of rotation of the tilt drive section by being attracted to the tilt magnet.

20. A disc drive apparatus according to claim 17, further comprising a magnetic portion disposed at the stationary section, the magnetic portion retaining the tilt drive section at a neutral position in a direction of rotation of the tilt drive section by attracting the tilt magnet.

21. A disc drive apparatus according to claim 15, further comprising a neutral spring, disposed between the tilt drive section and the stationary section, for retaining the tilt drive section at a neutral position in a direction of rotation of the tilt drive section.

22. A disc drive apparatus according to claim 19, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

23. A disc drive apparatus according to claim 20, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

24. A disc drive apparatus according to claim 18, wherein the supporting shaft is formed of a magnetic material, and wherein the tilt drive section comprises a magnet member disposed so as to oppose the supporting shaft in the focusing directions.

25. A disc drive apparatus according to claim 18, wherein the tilt drive section further comprises a bearing for inserting the supporting shaft.

26. A disc drive apparatus according to claim 25, wherein the bearing is formed of a high-polymer material.

27. A disc drive apparatus according to claim 25, wherein, when the axial direction of the supporting shaft is defined as a thrust direction, an outer peripheral surface of the supporting shaft or an inner peripheral surface of the bearing is provided with a plurality of sliding protrusions that are separated from each other in the thrust direction.

28. A disc drive apparatus according to claim 25, wherein the bearing comprises a thrust receiver for receiving an end of the supporting shaft in the axial direction thereof.

29. An optical pickup comprising:
a movable base moving in radial directions of a disc-shaped recording medium, which is mounted to a disc table; and
an objective lens drive device disposed at the movable base,
wherein the objective lens drive device comprises a supporting block, a movable block, and a supporting spring, the movable block holding an objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block, and
wherein the supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section, wherein the tilt magnetic circuit includes a tilt coil and a tilt magnet that opposes the tilt coil, the tilt coil being disposed at the tilt drive section, the tilt magnet being disposed at the stationary section, and further comprising a magnetic portion disposed at the tilt drive section, the magnetic portion retaining the tilt drive section at a neutral position in a direction of rotation of the tilt drive section by being attracted to the tilt magnet, and wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

30. An optical pickup comprising:
a movable base moving in radial directions of a disc-shaped recording medium, which is mounted to a disc table; and
an objective lens drive device disposed at the movable base,
wherein the objective lens drive device comprises a supporting block, a movable block, and a supporting spring, the movable block holding an objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block, and
wherein the supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section, wherein the tilt magnetic circuit includes a tilt coil and a tilt magnet that opposes the tilt coil, the tilt coil being disposed at the stationary section, the tilt magnet being disposed at the tilt drive section, and further comprising a magnetic portion disposed at the stationary section, the magnetic portion retaining the tilt drive section at a neutral position in a direction of rotation of the tilt drive section by attracting the tilt magnet, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

31. A disc drive apparatus comprising:

a disc table for mounting a disc-shaped recording medium; and an optical pickup for irradiating the disc-shaped recording medium, which is mounted to the disc table, with a laser beam through an objective lens, wherein the optical pickup comprises a movable base moving in radial directions of the disc-shaped recording medium, which is mounted to the disc table; and an objective lens drive device disposed at the movable base, wherein the objective lens drive device comprises a supporting block, a movable block, and a supporting spring, the movable block holding the objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block, and wherein the supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section, and further comprising a magnetic portion disposed at the tilt drive section, the magnetic portion retaining the tilt drive section at a neutral position in a direction of rotation of the tilt drive section by being attracted to the tilt magnet, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

32. A disc drive apparatus comprising:

a disc table for mounting a disc-shaped recording medium; and an optical pickup for irradiating the disc-shaped recording medium, which is mounted to the disc table, with a laser beam through an objective lens, wherein the optical pickup comprises a movable base moving in radial directions of the disc-shaped recording medium, which is mounted to the disc table; and an objective lens drive device disposed at the movable base, wherein the objective lens drive device comprises a supporting block, a movable block, and a supporting spring, the movable block holding the objective lens and moving with respect to the supporting block in focusing directions and tracking direction, the focusing directions corresponding to directions in which the movable block moves into contact with and separates from a recording surface of the disc-shaped recording medium, the tracking directions corresponding to substantially radial directions of the disc-shaped recording medium, the supporting spring connecting the supporting block and the movable block, and wherein the supporting block comprises a stationary section, a supporting shaft, a tilt drive section, and a tilt magnetic circuit, the stationary section being secured to the movable base, an axial direction of the supporting shaft being perpendicular to the focusing directions and the tracking directions, the tilt drive section being rotatably supported at the stationary section through the supporting shaft and being connected to the movable block by the supporting spring, the tilt magnetic circuit rotating the tilt drive section with respect to the stationary section, wherein the tilt magnetic circuit includes a tilt coil and a tilt magnet that opposes the tilt coil, the tilt coil being disposed at the stationary section, the tilt magnet being disposed at the stationary section, and further comprising a magnetic portion disposed at the stationary section, the magnetic portion retaining the tilt drive section at a neutral position in a direction of rotation of the tilt drive section by attracting the tilt magnet, wherein, when the axial direction of the supporting shaft is defined as a thrust direction, the tilt magnet and the magnetic portion are disposed so that a central point of the tilt magnet in the thrust direction and a central point of the magnetic portion in the thrust direction are separated from each other in the thrust direction.

* * * * *

UNITED STATES PATENT AND TRADEMARK OFFICE
CERTIFICATE OF CORRECTION

PATENT NO. : 7,245,563 B2  Page 1 of 1
APPLICATION NO. : 10/477719
DATED : July 17, 2007
INVENTOR(S) : Hidetoshi Tanaka It is certified that error appears in the above-identified patent and that said Letters Patent is hereby corrected as shown below:

Column 19, Line 7:
"tracking direction" should read -- tracking directions --.

Column 19, Line 20:
"tracking direction" should read -- tracking directions --.

Column 20, Line 41:
"tracking direction" should read -- tracking directions --.

Column 22, Line 2:
"tracking direction" should read -- tracking directions --.

Column 22, Line 45:
"tracking direction" should read -- tracking directions --.

Column 23, Line 26:
"tracking direction" should read -- tracking directions --.

Column 24, Line 18:
"tracking direction" should read -- tracking directions --.

Signed and Sealed this

Thirteenth Day of November, 2007

JON W. DUDAS
*Director of the United States Patent and Trademark Office*